(12) United States Patent
Ohya et al.

(10) Patent No.: US 10,659,706 B2
(45) Date of Patent: May 19, 2020

(54) PHOTOELECTRIC CONVERSION DEVICE AND IMAGING SYSTEM

(71) Applicant: CANON KABUSHIKI KAISHA, Tokyo (JP)

(72) Inventors: Takeru Ohya, Machida (JP); Satoshi Koizumi, Kawasaki (JP); Masahiro Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 15/955,146

(22) Filed: Apr. 17, 2018

(65) Prior Publication Data

US 2018/0309946 A1 Oct. 25, 2018

(30) Foreign Application Priority Data

Apr. 24, 2017 (JP) ................. 2017-085494

(51) Int. Cl.
*H04N 5/359* (2011.01)
*H04N 5/374* (2011.01)
(Continued)

(52) U.S. Cl.
CPC ......... *H04N 5/3597* (2013.01); *H04N 5/2355* (2013.01); *H04N 5/23229* (2013.01);
(Continued)

(58) Field of Classification Search
CPC ....... G03B 17/561; G06F 16/50; G06F 3/011; G06Q 10/20; G09B 19/24; G09B 5/02;
(Continued)

(56) References Cited

U.S. PATENT DOCUMENTS 7,462,810 B2 12/2008 Kobayashi et al. ........ 250/208.1
7,928,477 B2 4/2011 Kobayashi et al. ......... 257/225
(Continued)

FOREIGN PATENT DOCUMENTS

JP 2013-172204 A 9/2013

OTHER PUBLICATIONS

U.S. Appl. No. 15/862,292, filed Jan. 4, 2018.
(Continued)

*Primary Examiner* — Amy R Hsu
(74) *Attorney, Agent, or Firm* — Venable LLP

(57) ABSTRACT

A photoelectric conversion device includes a plurality of pixels each of which includes a photoelectric converter that generates charges by photoelectric conversion, a first transfer unit that transfers charges in the photoelectric converter to a first holding portion, a second transfer unit that transfers charges in the first holding portion to a second holding portion, an amplifier unit that outputs a signal based on charges held in the second holding portion, and a third transfer unit that transfers charges of the photoelectric converter to a drain portion; and a control unit that, in an exposure period in which signal charges are accumulated in the photoelectric converter, changes a potential barrier formed by the third transfer unit with respect to the signal charges accumulated in the photoelectric converter from a first level to a second level that is higher than the first level.

32 Claims, 24 Drawing Sheets

(51) Int. Cl.
*H04N 5/232* (2006.01)
*H04N 5/235* (2006.01)
*H04N 5/3745* (2011.01)

(52) U.S. Cl.
CPC ......... *H04N 5/3592* (2013.01); *H04N 5/3742* (2013.01); *H04N 5/3745* (2013.01); *H04N 5/37452* (2013.01)

(58) Field of Classification Search
CPC ............ G09B 5/04; H04N 2005/4408; H04N 5/2258; H04N 5/23296; H04N 5/247; H04N 5/4403
See application file for complete search history.

(56) References Cited

U.S. PATENT DOCUMENTS

| | | | |
|---|---|---|---|
| 7,935,995 B2 | 5/2011 | Watanabe et al. ............ 257/292 |
| 8,045,034 B2 | 10/2011 | Shibata et al. ................. 348/308 |
| 8,063,351 B2 | 11/2011 | Kobayashi et al. ........ 250/208.1 |
| 8,174,604 B2 | 5/2012 | Shibata et al. ................. 348/308 |
| 8,189,086 B2 | 5/2012 | Hashimoto et al. .......... 348/300 |
| 8,222,682 B2 | 7/2012 | Watanabe et al. ............ 257/292 |
| 8,259,206 B1 | 9/2012 | Shibata et al. ................. 348/308 |
| 8,289,432 B2 | 10/2012 | Shibata et al. ................. 348/308 |
| 8,357,956 B2 | 1/2013 | Kobayashi et al. ........... 257/225 |
| 8,456,559 B2 | 6/2013 | Yamashita et al. ........... 348/308 |
| 8,552,353 B2 | 10/2013 | Kobayashi et al. ........ 250/208.1 |
| 8,723,232 B2 | 5/2014 | Kobayashi et al. ........... 257/225 |
| 8,884,391 B2 | 11/2014 | Fudaba et al. ................. 257/432 |
| 8,957,360 B2 | 2/2015 | Yamashita et al. |
| 9,142,575 B2 | 9/2015 | Kobayashi et al. .......................... H01L 27/14601 |
| 9,147,708 B2 | 9/2015 | Okita et al. ......... H01L 27/1461 |
| 9,153,610 B2 | 10/2015 | Kobayashi et al. .......................... H01L 27/14601 |
| 9,276,027 B2 | 3/2016 | Okita et al. ......... H01L 27/1461 |
| 9,344,653 B2 | 5/2016 | Shimotsusa et al. .. H04N 5/369 |
| 9,419,038 B2 | 8/2016 | Kobayashi et al. .......................... H01L 27/14603 |
| 9,445,026 B2 | 9/2016 | Kobayashi et al. .......................... H01L 27/14601 |
| 9,538,112 B2 | 1/2017 | Wada et al. ............ H04N 5/378 |
| 9,548,328 B2 | 1/2017 | Hasegawa et al. .......................... H01L 27/14612 |
| 9,716,849 B2 | 7/2017 | Kobayashi et al. ... H04N 5/361 |
| 9,768,213 B2 | 9/2017 | Soda et al. ........ H01L 27/14612 |
| 9,818,794 B2 | 11/2017 | Okita et al. ........ H01L 27/14812 |
| 9,876,975 B2 | 1/2018 | Yoshida et al. ...... H04N 5/3745 |
| 9,894,295 B2* | 2/2018 | Kawabata ............ H04N 5/3535 |
| 9,906,743 B2 | 2/2018 | Shimotsusa et al. .. H04N 5/369 |
| 2010/0157083 A1 | 6/2010 | Ohya et al. ................. 348/222.1 |
| 2010/0321532 A1 | 12/2010 | Hashimoto et al. .......... 348/234 |
| 2013/0265232 A1* | 10/2013 | Yun .................... G06K 9/00671 345/158 |
| 2014/0061436 A1 | 3/2014 | Kobayashi ................. 250/208.1 |
| 2015/0062000 A1* | 3/2015 | Saito .................. G02B 27/0172 345/156 |
| 2016/0073016 A1 | 3/2016 | Ohya et al. ................. 348/207.1 |
| 2016/0165111 A1* | 6/2016 | Uemura .................... G02B 7/08 348/208.11 |
| 2016/0309102 A1 | 10/2016 | Koizumi ............. H04N 5/3696 |
| 2016/0322406 A1 | 11/2016 | Kobayashi et al. .......................... H01L 27/14603 |
| 2017/0078557 A1 | 3/2017 | Kawabata et al. .......................... H04N 5/23212 |
| 2017/0078604 A1 | 3/2017 | Kobayashi et al. .. H01L 27/146 |
| 2017/0244921 A1* | 8/2017 | Velichko ............ H01L 27/1461 |
| 2017/0289478 A1 | 10/2017 | Kobayashi et al. ... H04N 5/361 |
| 2017/0359535 A1 | 12/2017 | Kobayashi et al. . H04N 3/1525 |
| 2017/0359538 A1 | 12/2017 | Kobayashi et al. .......................... H04N 5/35545 |
| 2017/0359539 A1 | 12/2017 | Kawabata et al. .......................... H04N 5/35554 |
| 2018/0006071 A1 | 1/2018 | Kato et al. ......... H01L 27/14625 |
| 2018/0026073 A1 | 1/2018 | Tsuboi et al. ....... H01L 27/1463 |
| 2018/0063460 A1 | 3/2018 | Ogino et al. ............ H04N 5/378 |
| 2018/0098013 A1 | 4/2018 | Yoshida et al. ........ H04N 5/378 |
| 2018/0167567 A1* | 6/2018 | Malinge ............. H04N 5/35554 |
| 2019/0020835 A1* | 1/2019 | Takahashi ........... H01L 27/1463 |

OTHER PUBLICATIONS

U.S. Appl. No. 15/791,909, filed Oct. 24, 2017.
U.S. Appl. No. 15/872,208, filed Jan. 16, 2018.
U.S. Appl. No. 15/914,505, filed Mar. 7, 2018.
U.S. Appl. No. 15/956,582, filed Apr. 18, 2018.

* cited by examiner

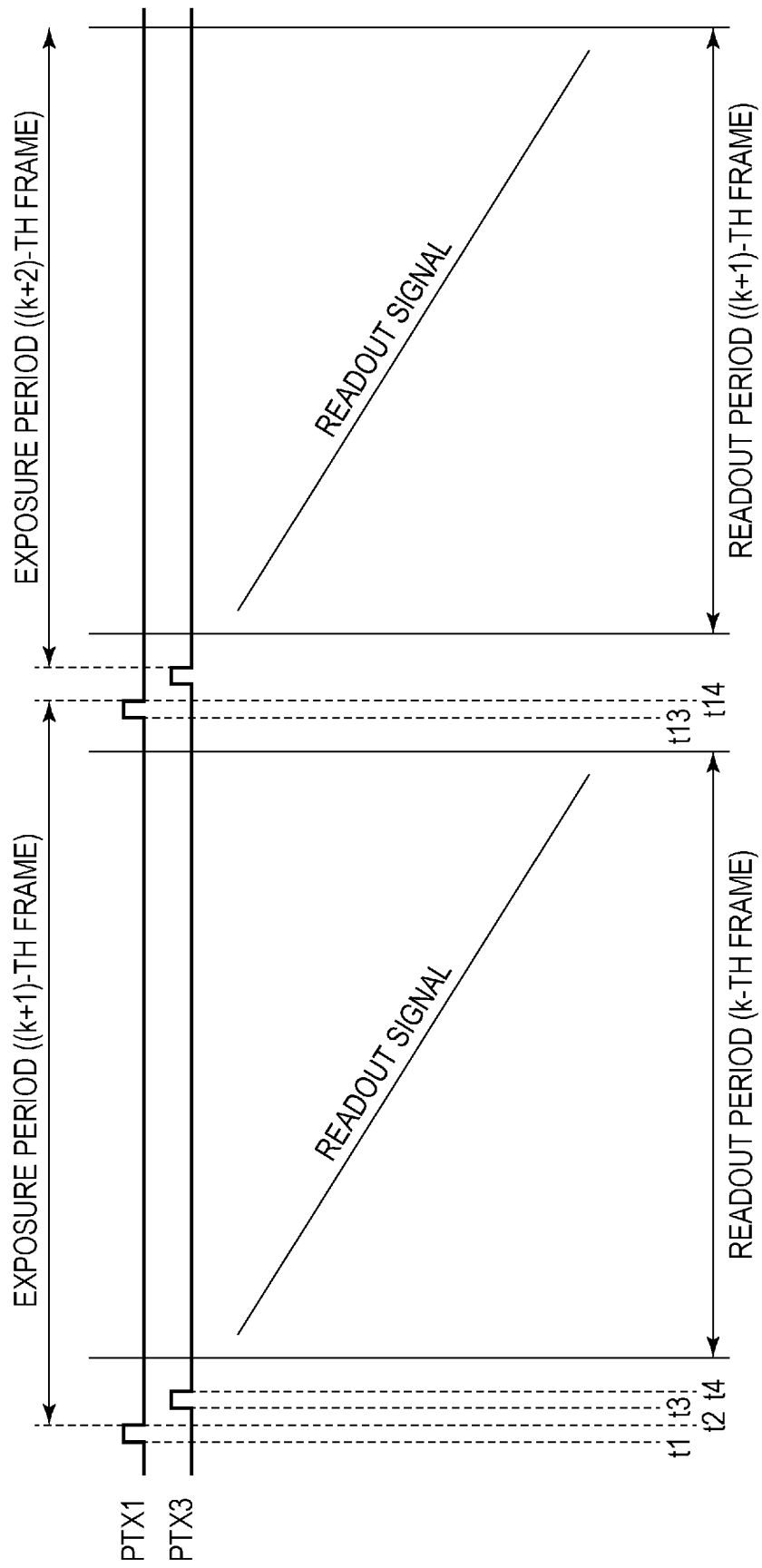

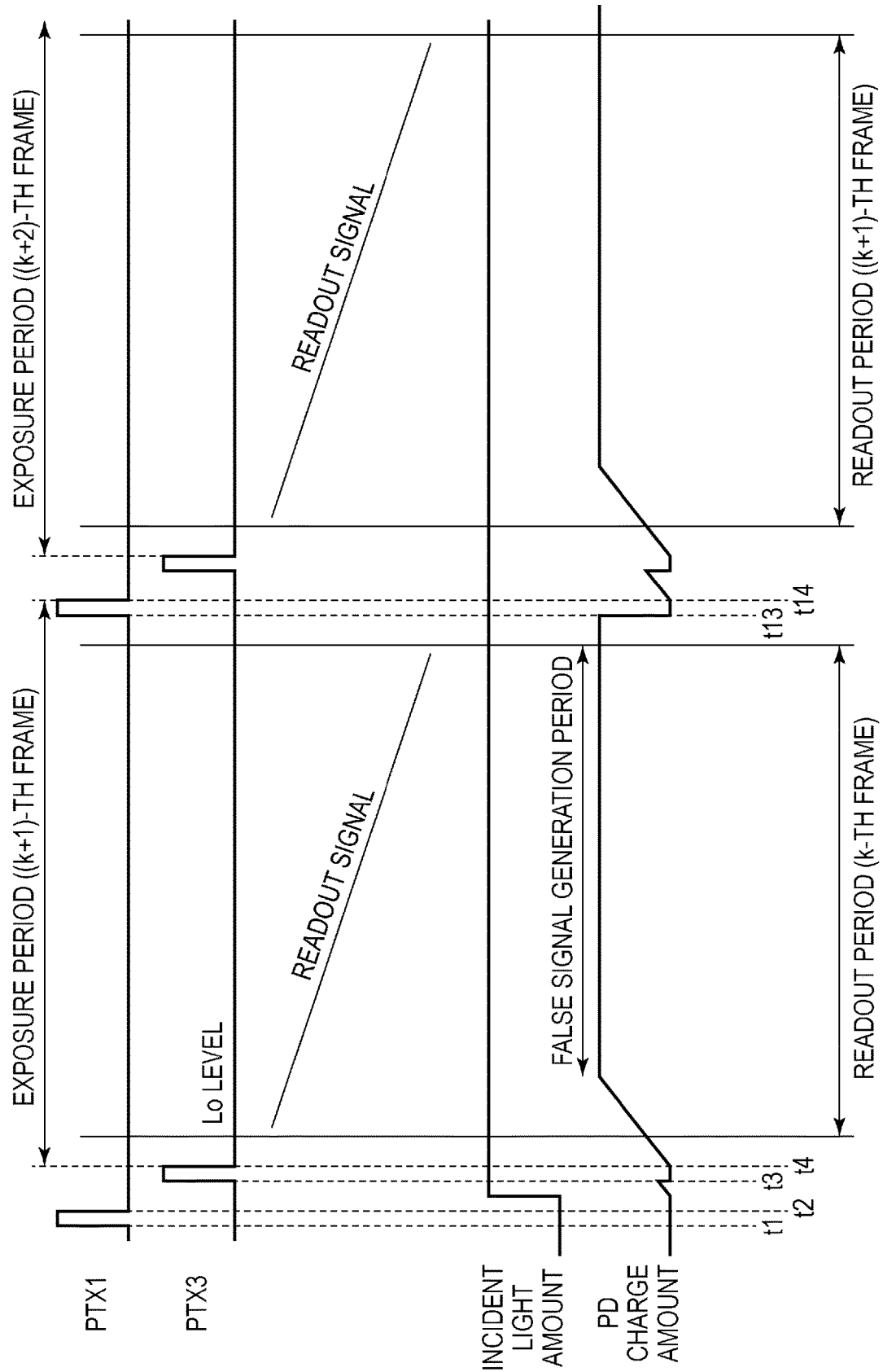

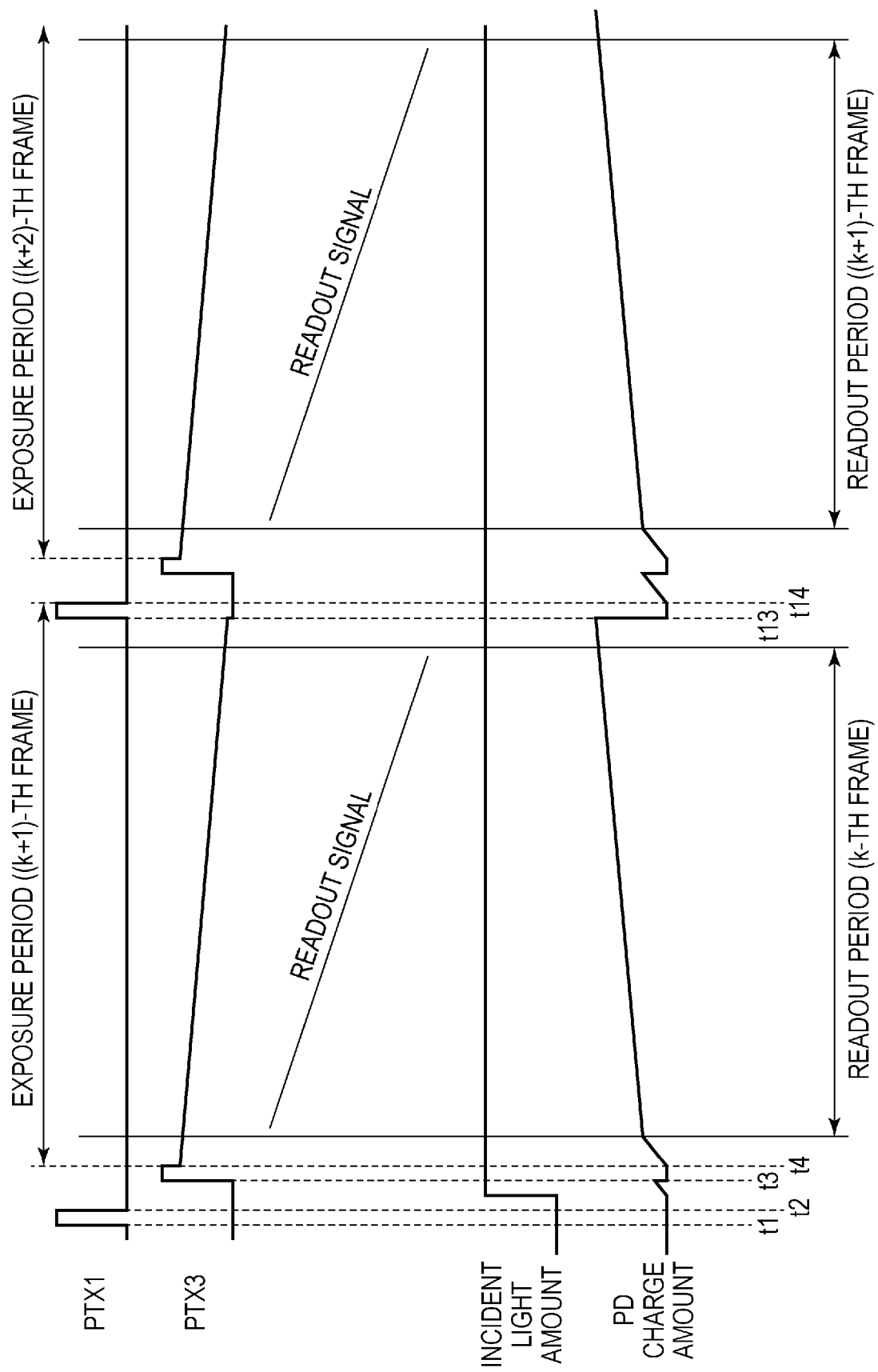

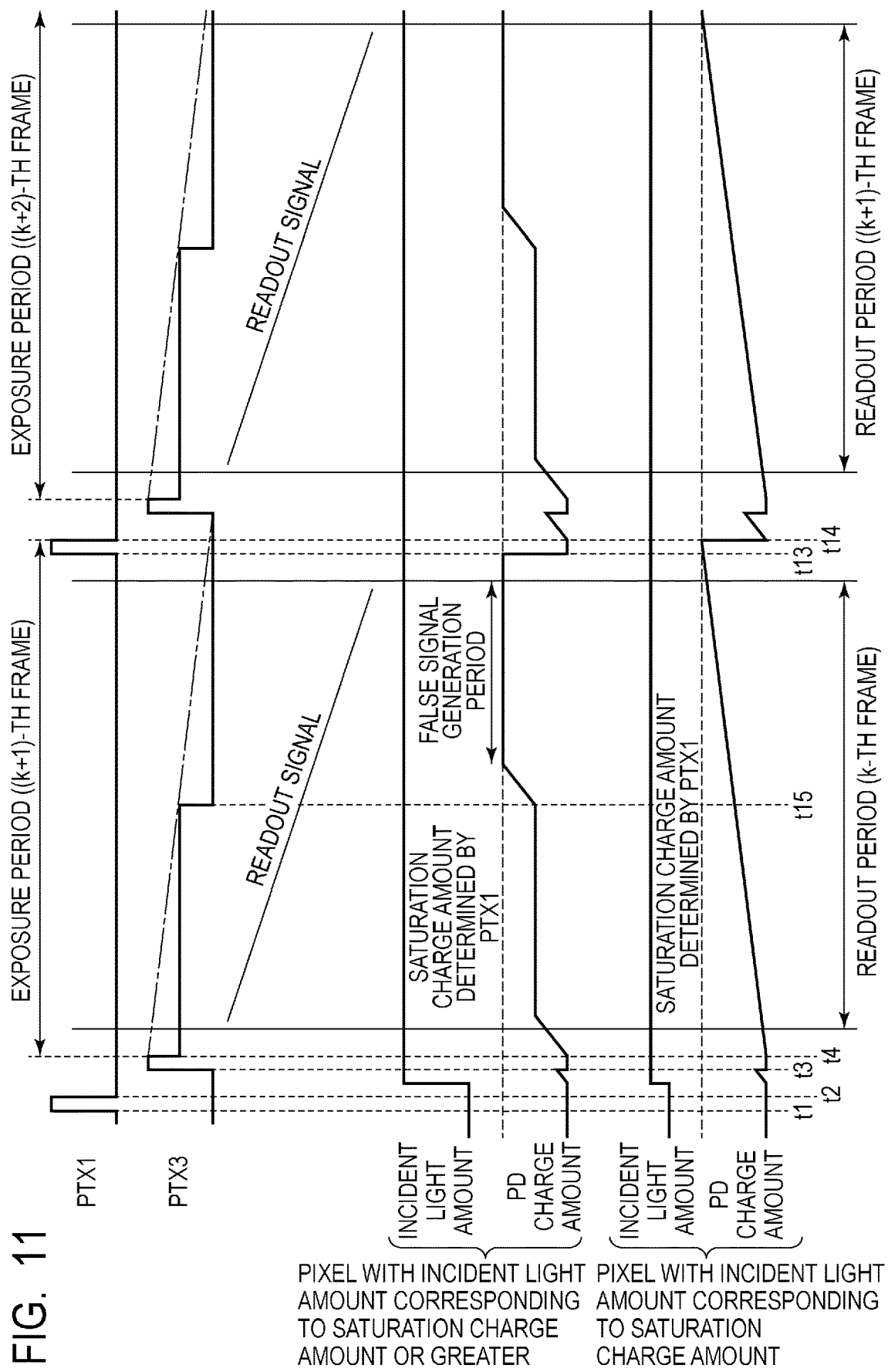

FIRST FRAME (L+1)-TH FRAME

PHOTOELECTRIC CONVERSION DEVICE AND IMAGING SYSTEM

BACKGROUND OF THE INVENTION

Field of the Invention

The present invention relates to a photoelectric conversion device and an imaging system.

Description of the Related Art

In a photoelectric conversion device in which a plurality of pixels form an imaging surface, so-called global electronic shutter is known in which the start time and the end time of charge accumulation operations are the same in all the pixels within the imaging surface. Japanese Patent Application Laid-Open No. 2013-172204 discloses a photoelectric conversion device having a global electronic shutter function.

Each pixel in the photoelectric conversion device disclosed in Japanese Patent Application Laid-Open No. 2013-172204 includes a photoelectric converter that generates charges, a first transfer switch that transfers charges from the photoelectric converter to a first holding portion, and a second transfer switch that transfers charges from the first holding portion to an FD region. Further, the pixel in the photoelectric conversion device disclosed in Japanese Patent Application Laid-Open No. 2013-172204 includes a third transfer switch that drains charges from the photoelectric converter to an overflow drain. With the same timing that stops draining charges from the photoelectric converter to the overflow drain in all the pixels, it is possible to have the same start time of the exposure period for all the pixels. Further, with the same timing of transferring charges from the photoelectric converter to the first holding portion in all the pixels, it is possible to have the same end time of the exposure period for all the pixels. This allows a global electronic shutter operation to be realized.

Japanese Patent Application Laid-Open No. 2013-172204 discloses that, during the exposure period of the photoelectric converter, the potential barrier of the third transfer switch with respect to charges accumulated in the photoelectric converter is set lower than the potential barrier of the first transfer switch with respect to charges accumulated in the photoelectric converter. This can prevent charges generated during an exposure period of the photoelectric converter from overflowing to the first holding portion side.

With a lower potential barrier of the third transfer switch during the exposure period of the photoelectric converter, however, the amount of signal charges that can be accumulated in the photoelectric converter (saturation charge amount) decreases resulting in a narrower dynamic range of the output signal. On the other hand, with a higher potential barrier of the third transfer switch during the exposure period of the photoelectric converter for increasing the saturation charge amount of the photoelectric converter, leakage of charges into the first holding portion from the photoelectric converter may occur, which may be superimposed as noise on the previous frame signal.

SUMMARY OF THE INVENTION

An object of the present invention is to provide a photoelectric conversion device and a method of driving the same that can prevent occurrence of a false signal due to leakage of charges into a holding portion from a photoelectric converter while suppressing reduction in the saturation charge amount of a photoelectric converter.

According to an aspect of the present invention, there is provided a photoelectric conversion device including a plurality of pixels each of which includes a photoelectric converter that generates charges by photoelectric conversion, a first transfer unit that transfers charges in the photoelectric converter to a first holding portion, a second transfer unit that transfers charges in the first holding portion to a second holding portion, an amplifier unit that outputs a signal based on charges held in the second holding portion, and a third transfer unit that transfers charges of the photoelectric converter to a drain portion, and a control unit that, in an exposure period in which signal charges are accumulated in the photoelectric converter, changes a potential barrier formed by the third transfer unit with respect to the signal charges accumulated in the photoelectric converter from a first level to a second level that is higher than the first level.

Further, according to another aspect of the present invention, there is provided a photoelectric conversion device including a plurality of pixels each of which includes a photoelectric converter that generates charges by photoelectric conversion, a first transfer unit that transfers charges in the photoelectric converter to a first holding portion, a second transfer unit that transfers charges in the first holding portion to a second holding portion, an amplifier unit that outputs a signal based on charges held in the second holding portion, and a third transfer unit that transfers charges of the photoelectric converter to a drain portion, an amplifier circuit that amplifies a signal based on signal charges by a gain that can be selected from at least a first gain and a second gain different from the first gain, and a control unit that controls a potential barrier formed by the third transfer unit with respect to the signal charges accumulated in the photoelectric converter to a first level when the gain is the first gain and controls a potential barrier of the third transfer unit with respect to the signal charges to a second level different from the first level when the gain is the second gain.

Further features of the present invention will become apparent from the following description of exemplary embodiments with reference to the attached drawings.

BRIEF DESCRIPTION OF THE DRAWINGS

FIG. 4 and FIG. 6 are timing diagrams illustrating drive timings of respective control signals in a typical global electronic shutter operation of the photoelectric conversion device.

FIG. 8 is a timing diagram illustrating a method of driving a photoelectric conversion device according to a second comparative example.

FIG. 10 is a timing diagram illustrating a method of driving the photoelectric conversion device according to the first embodiment.

FIG. 11 is a timing diagram illustrating a method of driving a photoelectric conversion device according to a third embodiment.

DESCRIPTION OF THE EMBODIMENTS

Preferred embodiments of the present invention will now be described in detail in accordance with the accompanying drawings.

[First Embodiment]

A photoelectric conversion device and a method of driving the same according to a first embodiment of the present invention will be described with reference to FIG. 1 to FIG. 10.

Figure 1:
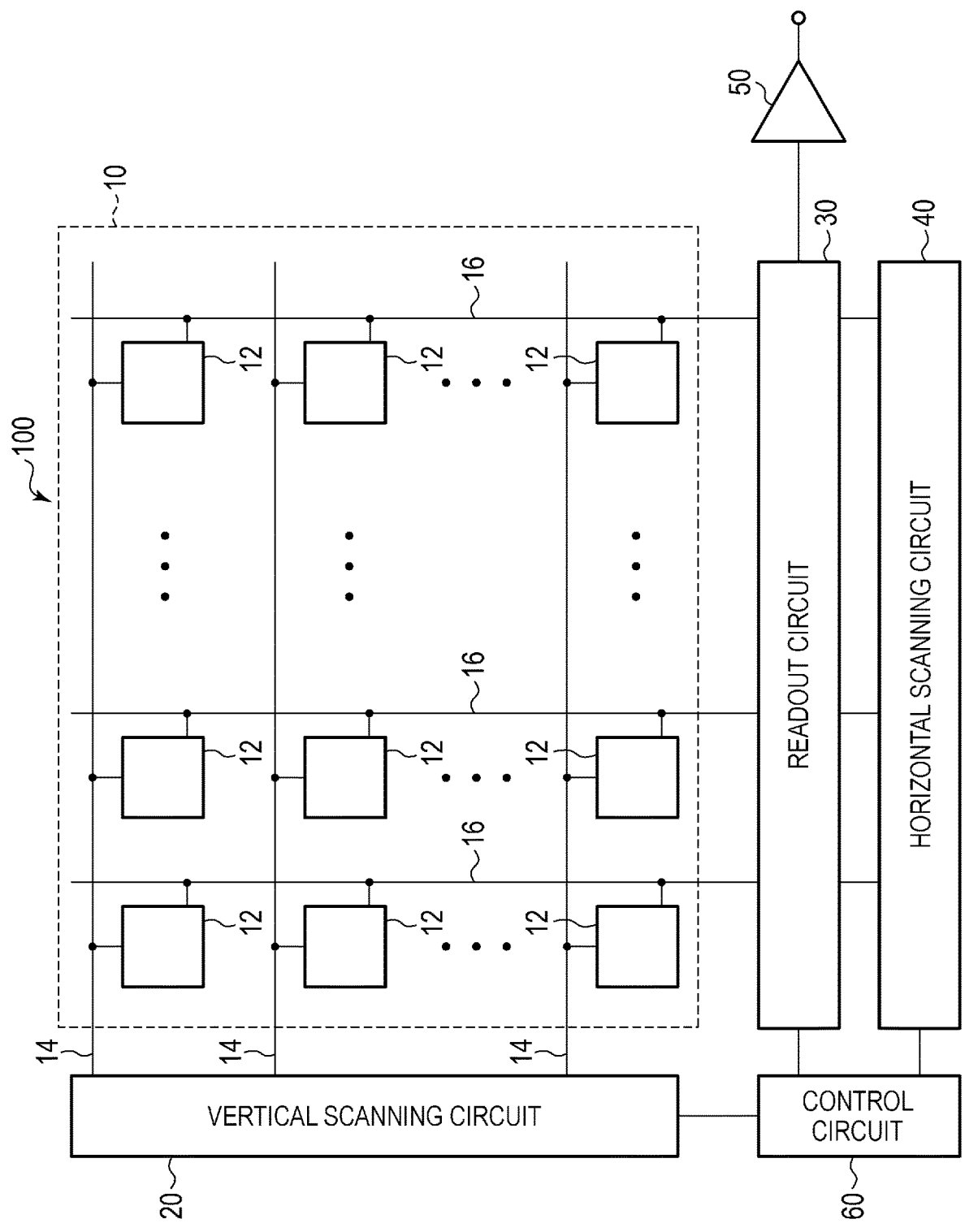
FIG. 1 is a block diagram illustrating a general configuration of a photoelectric conversion device according to a first embodiment.
Figure 2:
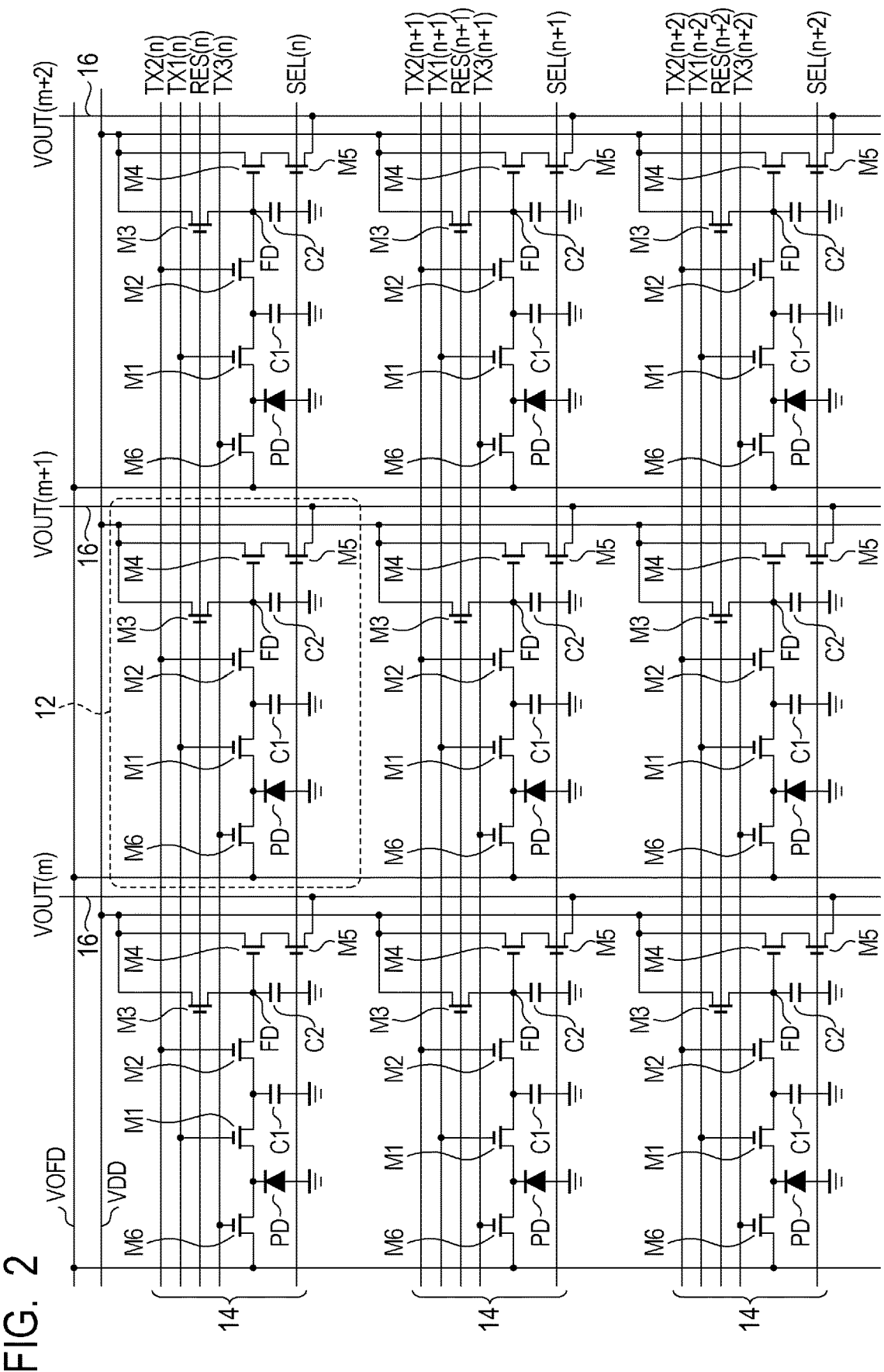
FIG. 2 is a circuit diagram illustrating a configuration example of pixels of the photoelectric conversion device according to the first embodiment.
Figure 3:
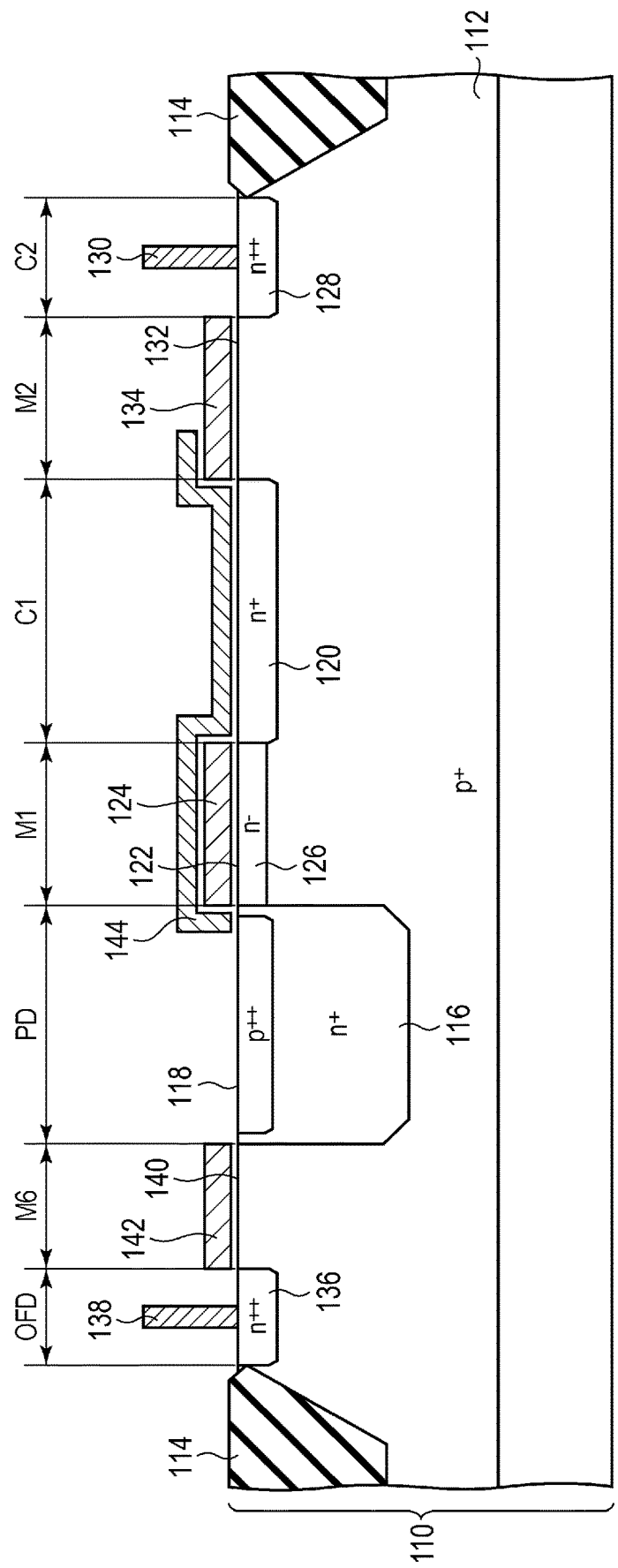
FIG. 3 is a schematic cross-sectional view illustrating the structure of a pixel of the photoelectric conversion device according to the first embodiment.

First, the configuration of the photoelectric conversion device according to the present embodiment will be described by using FIG. 1 to FIG. 3 with an example of a CMOS image sensor. FIG. 1 is a block diagram illustrating a general configuration of the photoelectric conversion device according to the present embodiment. FIG. 2 is a circuit diagram illustrating a configuration example of pixels of the photoelectric conversion device according to the present embodiment. FIG. 3 is a schematic cross-sectional view illustrating the structure of a pixel of the photoelectric conversion device according to the present embodiment.

As illustrated in FIG. 1, a photoelectric conversion device 100 according to the present embodiment includes an imaging region 10, a vertical scanning circuit 20, a readout circuit 30, a horizontal scanning circuit 40, an output circuit 50, and a control circuit 60. The photoelectric conversion device 100 can be formed of a single chip using a semiconductor substrate.

In the imaging region 10, a plurality of pixels 12 arranged in a matrix over a plurality of rows and a plurality of columns are provided. Each of the pixels 12 includes a photoelectric conversion element that converts an incident light into charges in accordance with the light amount thereof. The number of rows and the number of columns of a pixel array arranged in the imaging region 10 are not limited in particular. Further, in the imaging region 10, other pixels (not illustrated) such as an optical black pixel that is shielded from light, a dummy pixel that outputs no signal, or the like may be arranged in addition to the pixels 12 that output signals in accordance with the light amount of an incident light.

A control signal line 14 is arranged on each row of the pixel array of the imaging region 10 extending in the row direction (horizontal direction in FIG. 1). The control signal line 14 is connected to the pixels 12 aligned in the row direction to form a signal line common to these pixels 12. Further, a vertical output line 16 is arranged on each column of the pixel array of the imaging region 10 extending in the column direction (vertical direction in FIG. 1). The vertical output line 16 is connected to the pixels 12 aligned in the column direction, respectively, to form a signal line common to these pixels 12.

The control signal lines 14 on respective rows are connected to the vertical scanning circuit 20. The vertical scanning circuit 20 is a control circuit that supplies, to the pixels 12 via the control signal lines 14 provided on a row basis of the pixel array, control signals for driving the readout circuit 30 within the pixels 12 when reading out signals from respective pixels 12. The vertical scanning circuit 20 can be configured using a shift resistor or an address decoder. Signals read out from the pixels 12 are input to the readout circuit 30 via the vertical output lines 16 provided on a column basis of the pixel array.

The readout circuit 30 is a circuit unit that performs a predetermined process, for example, signal processing such as an amplification process, an addition process, or the like on the signals read out from the pixels 12. The readout circuit 30 may include signal holding units, column amplifiers, correlated double sampling (CDS) circuits, adder circuits, or the like. The readout circuit 30 may further include an analog-to-digital (A/D) converter circuit or the like if necessary.

The horizontal scanning circuit 40 is a circuit unit that supplies, to the readout circuit 30, control signals used for transferring signals processed in the readout circuit 30 to the output circuit 50 sequentially on a column basis. The horizontal scanning circuit 40 can be configured using a shift resistor or an address decoder. The output circuit 50 is a circuit unit that is formed of a buffer amplifier, a differential amplifier, or the like to amplify and output a signal on a column selected by the horizontal scanning circuit 40.

The control circuit 60 is a circuit unit that supplies, to the vertical scanning circuit 20, the readout circuit 30, and the horizontal scanning circuit 40, control signals for controlling the operation or the timing thereof. Some or all of the control signals supplied to the vertical scanning circuit 20, the readout circuit 30, and the horizontal scanning circuit 40 may be supplied from the outside of the photoelectric conversion device 100.

FIG. 2 is a circuit diagram illustrating an example of pixel circuits forming the imaging region 10. While FIG. 2 depicts nine pixels 12 arranged in three rows by three columns out of the pixels 12 forming the imaging region 10, the number of pixels 12 forming the imaging region 10 is not limited in particular.

Each of the plurality of pixels 12 includes a photoelectric converter PD, transfer transistors M1, M2, and M6, a reset transistor M3, an amplifier transistor M4, and a select transistor M5. The photoelectric converter PD is a photodiode, for example. The anode of the photodiode of the photoelectric converter PD is connected to a ground voltage line, and the cathode is connected to the source of the transfer transistor M1 and the source of the transfer transistor M6. The transfer transistor M6 may be referred to as an overflow transistor, a charge drain transistor, or the like. The drain of the transfer transistor M1 is connected to the source of the transfer transistor M2. The connection node of the drain of the transfer transistor M1 and the source of the transfer transistor M2 includes a capacitance component and has a function of a holding portion of charges. In FIG. 2, this capacitance component is represented as a capacitor (C1), one terminal of which is connected to the node. In the following description, this capacitor may be denoted as a holding portion C1. The other terminal of the capacitor forming the holding portion C1 is grounded.

The drain of the transfer transistor M2 is connected to the source of the reset transistor M3 and the gate of the amplifier transistor M4. The connection node of the drain of the transfer transistor M2, the source of the reset transistor M3, and the gate of the amplifier transistor M4 is a so-called floating diffusion (FD) portion. The FD portion includes a capacitance component (floating diffusion capacitor) and has a function of a holding portion of charges. In FIG. 2, this capacitance component is represented as a capacitor (C2), one terminal of which is connected to the FD portion. In the following description, the FD portion may be denoted as a holding portion C2. The other terminal of the capacitor forming the holding portion C2 is grounded.

The drain of the reset transistor M3 and the drain of the amplifier transistor M4 are connected to a power source voltage line (VDD). Further, the drain of the transfer transistor M6 is connected to a power source voltage line (VOFD) that functions as an overflow drain OFD. Note that any two or three of a voltage supplied to the drain of the reset transistor M3, a voltage supplied to the drain of the amplifier transistor M4, and a voltage supplied to the drain of the transfer transistor M6 may be the same, or all of the above may be different. The source of the amplifier transistor M4 is connected to the drain of the select transistor M5. The source of the select transistor M5 is connected to the vertical output line 16.

In the case of the pixel configuration of FIG. 2, each of the control signal lines 14 arranged in the imaging region 10 includes signal lines TX1, TX2, TX3, RES, and SEL. The signal line TX1 is connected to the gates of the transfer transistors M1 of the pixels 12 belonging to the corresponding row, respectively, and forms a signal line common to these pixels 12. The signal line TX2 is connected to the gates of the transfer transistors M2 of the pixels 12 belonging to the corresponding row, respectively, and forms a signal line common to these pixels 12. The signal line TX3 is connected to the gates of the transfer transistors M6 of the pixels 12 belonging to the corresponding row, respectively, and forms a signal line common to these pixels 12. The signal line RES is connected to the gates of the reset transistors M3 of the pixels 12 belonging to the corresponding row, respectively, and forms a signal line common to these pixels 12. The signal line SEL is connected to the gates of the select transistors M5 of the pixels 12 belonging to the corresponding row, respectively, and forms a signal line common to these pixels 12. Note that, in FIG. 2, the corresponding row number is provided to the name of each control line (for example, TX1($n$), TX1($n$+1), TX1($n$+2)).

A control signal PTX1 that is a drive pulse for controlling the transfer transistor M1 is output to the signal line TX1 from the vertical scanning circuit 20. A control signal PTX2 that is a drive pulse for controlling the transfer transistor M2 is output to the signal line TX2 from the vertical scanning circuit 20. A control signal PTX3 that is a drive pulse for controlling the transfer transistor M6 is output to the signal line TX3 from the vertical scanning circuit 20. A control signal PRES that is a drive pulse for controlling the reset transistor M3 is output to the signal line RES from the vertical scanning circuit 20. A control signal PSEL that is a drive pulse for controlling the select transistor M5 is output to the signal line SEL from the vertical scanning circuit 20. When each transistor is formed of an n-channel transistor, the corresponding transistor is turned on when supplied with a high level (hereafter, referred to as "Hi-level") control signal from the vertical scanning circuit 20. Further, the corresponding transistor is turned off when supplied with a low level (hereafter, referred to as "Lo-level") control signal from the vertical scanning circuit 20.

The vertical output line 16 arranged on each column of the imaging region 10 is connected to the sources of the select transistors M5 of the pixels 12 aligned in the column direction, respectively, and forms a signal line common to these pixels 12. Note that the select transistor M5 of the pixel 12 may be omitted. In this case, the vertical output line 16 is connected to the sources of the amplifier transistors M4.

The photoelectric converter PD converts (photoelectrically converts) an incident light into charges in accordance with the light amount thereof and accumulates the generated charges. The transfer transistor M6 resets the photoelectric converter PD to a predetermined electrical potential in accordance with the voltage of the power source voltage line VOFD. In other words, the transfer transistor M6 is a transfer unit that transfers charges held by the photoelectric converter PD to the power source voltage line VOFD. The transfer transistor M1 is a transfer unit that transfers charges held in the photoelectric converter PD to the holding portion C1. The holding portion C1 holds charges generated by the photoelectric converter PD in a different location from the photoelectric converter PD. The transfer transistor M2 is a transfer unit that transfers charges held in the holding portion C1 to the holding portion C2. The holding portion C2 holds charges transferred from the holding portion C1 and sets the voltage of the FD portion, which is also the input node of an amplifier unit (the gate of the amplifier transistor M4), to a voltage in accordance with the capacitance value of the holding portion C2 and the amount of the transferred charges. The reset transistor M3 is a reset unit that resets the holding portion C2 to a predetermined electrical potential in accordance with the voltage of the power source voltage line VDD. The select transistor M5 selects the pixels 12 which output signals to the vertical output lines 16. In the amplifier transistor M4, the drain is supplied with the power source voltage, and the source is supplied with a bias current from a current source via the select transistor M5, which forms the amplifier unit (source follower circuit) whose gate is the input node. Thereby, the amplifier transistor M4 outputs a signal VOUT based on charges generated by an incident light to the vertical output line 16. Note that, in FIG. 2, the corresponding column number is provided to the signal VOUT (Vout(m), Vout(m+1), Vout(m+2)).

FIG. 3 is a partial cross-sectional view of the pixel 12 formed on a semiconductor substrate. FIG. 3 depicts the transfer transistors M1, M2, and M6, the photoelectric converter PD, the holding portions C1 and C2, and an overflow drain OFD out of the components of the pixel 12. The overflow drain OFD is the drain of the transfer transistor M6 and functions as a drain portion of charges from the photoelectric converter PD. In this example, the conductivity type of each semiconductor region will be described with an example where electrons are used as signal charges. When holes are used as signal charges, the conductivity type of each semiconductor region is the opposite conductivity type.

A p-type semiconductor region 112 forming a well is provided in the surface portion of the n-type semiconductor substrate 110. Note that the semiconductor substrate 110 may be of a p-type and, in this case, the semiconductor substrate 110 itself may be the p-type semiconductor region 112. Element isolation regions 114 defining an active region are provided on the surface of the p-type semiconductor region 112. The element isolation region 114 is an insulating region formed by STI (Shallow Trench Isolation) method or LOCOS (LOCal Oxidation of Silicon) method, for example.

The overflow drain OFD, the transfer transistor M6, the photoelectric converter PD, the transfer transistor M1, the holding portion C1, the transfer transistor M2, and the holding portion C2 are arranged neighbored in this order in the active region defined by the element isolation region 114. Note that the reset transistor M3, the amplifier transistor M4, and the select transistor M5, which are other components of the pixel 12, are provided in another active region (not illustrated).

The photoelectric converter PD includes an n-type semiconductor region 116 forming a p-n junction to the p-type semiconductor region 112. The n-type semiconductor region 116 has the same polarity as electrons that are signal charges and serves as a charge accumulation layer that accumulates signal charges generated by the photoelectric converter PD. A p-type semiconductor region 118 is provided in the surface portion of the p-type semiconductor region 112 over the n-type semiconductor region 116. The p-type semiconductor region 118 is used for forming the photoelectric converter PD as a so-called buried photodiode structure and serves to suppress an influence of a dark current caused by an influence of an interface state of the surface of the semiconductor substrate 110.

The holding portion C1 includes an n-type semiconductor region 120 provided spaced apart from the n-type semiconductor region 116 on the surface of the p-type semiconductor region 112. The n-type semiconductor region 120 serves as a charge holding layer that holds signal charges transferred from the photoelectric converter PD. The holding portion C1 may be the buried diode structure similar to the photoelectric converter PD.

A gate electrode 124 is provided over the semiconductor substrate 110 between the n-type semiconductor region 116 and the n-type semiconductor region 120 with a gate insulating film 122 interposed therebetween. Thereby, the transfer transistor M1 is formed in which the gate electrode 124 is the gate, the n-type semiconductor region 116 is the source, and the n-type semiconductor region 120 is the drain. The potential state between the photoelectric converter PD and the holding portion C1 can be controlled by a voltage supplied to the gate electrode 124. For example, it is possible for the transfer transistor M1 to form a potential barrier with respect to signal charges accumulated in the n-type semiconductor region 116. Under the gate electrode 124, an n-type semiconductor region 126 having a lower impurity concentration than the n-type semiconductor region 116 is provided within the p-type semiconductor region 112 between the n-type semiconductor region 116 and the n-type semiconductor region 120.

The holding portion C2 includes an n-type semiconductor region 128 provided spaced apart from the n-type semiconductor region 120 in the surface portion of the p-type semiconductor region 112. The n-type semiconductor region 128 serves as a charge holding layer that holds signal charges transferred from the holding portion C1. On the n-type semiconductor region 128, a contact plug 130 for electrically connecting the holding portion C1 to the source of the reset transistor M3 and the gate of the amplifier transistor M4 (not illustrated) is provided.

A gate electrode 134 is provided over the semiconductor substrate 110 between the n-type semiconductor region 120 and the n-type semiconductor region 128 with a gate insulating film 132 interposed therebetween. Thereby, the transfer transistor M2 is formed in which the gate electrode 134 is the gate, the n-type semiconductor region 120 is the source, and the n-type semiconductor region 128 is the drain. The potential state between the holding portion C1 and the holding portion C2 can be controlled by a voltage supplied to the gate electrode 134.

The overflow drain OFD includes an n-type semiconductor region 136 provided spaced apart from the n-type semiconductor region 116 in the surface portion of the p-type semiconductor region 112. On the n-type semiconductor region 128, a contact plug 138 for electrically connecting the n-type semiconductor region 136 to the power source voltage line VOFD (not illustrated) is provided.

A gate electrode 142 is provided over the semiconductor substrate 110 between the n-type semiconductor region 116 and the n-type semiconductor region 136 with a gate insulating film 140 interposed therebetween. Thereby, the transfer transistor M6 is formed in which the gate electrode 142 is the gate, the n-type semiconductor region 116 is the source, and the n-type semiconductor region 136 is the drain. The potential state between the photoelectric converter PD and the overflow drain OFD can be controlled by a voltage supplied to the gate electrode 142. For example, it is possible for the transfer transistor M1 to form a potential barrier with respect to signal charges accumulated in the n-type semiconductor region 116.

Over the semiconductor substrate 110, a light-shielding film 144 for preventing an incident light to the imaging region 10 from reaching the holding portion C1 is provided. To this end, the light-shielding film 144 is provided so as to cover at least the holding portion C1. In terms of a higher light-shielding performance, it is preferable to arrange the light-shielding film 144 so as to extend from the holding portion C1 and cover the entire gate electrode 124 and a part of the gate electrode 134 as illustrated in FIG. 3, for example.

Figure 4:
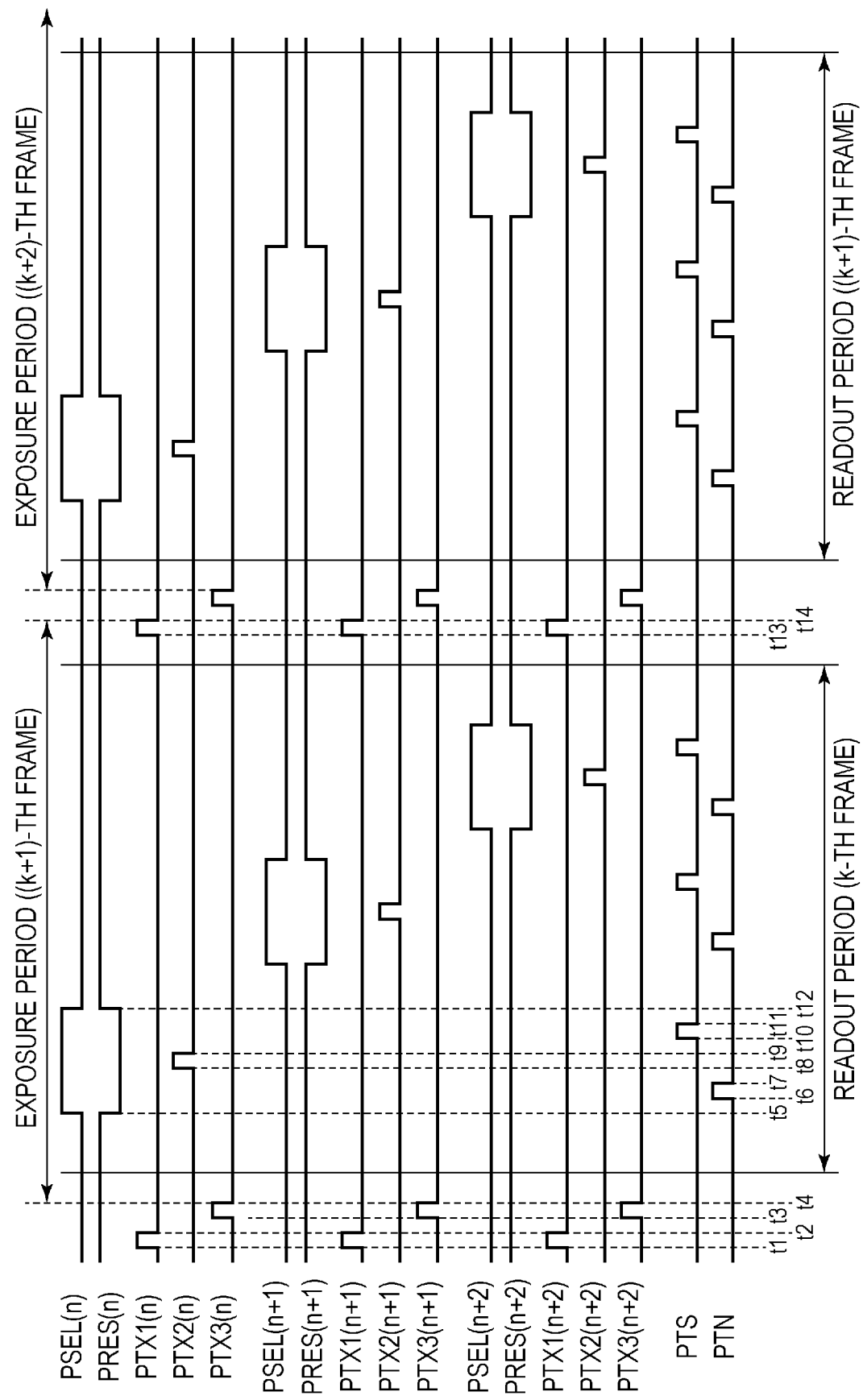
Figure 5A:
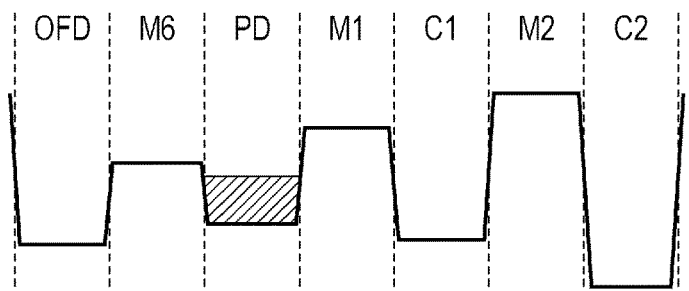
FIG. 5A, FIG. 5B, FIG. 5C, FIG. 5D, FIG. 5E and FIG. 5F are diagrams schematically illustrating changes in potential states of respective portions of the pixel.
Figure 5B:
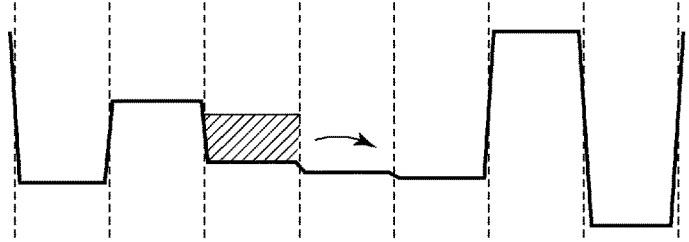
Figure 5C:
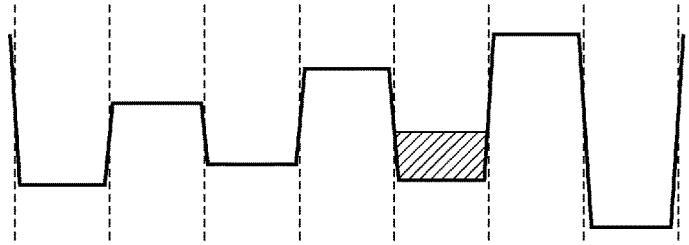
Figure 5D:
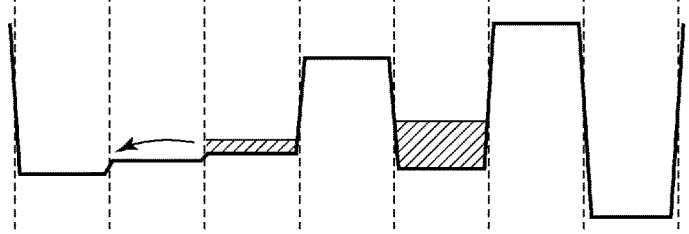
Figure 5E:
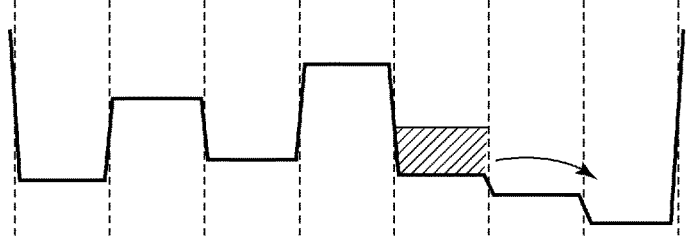
Figure 5F:
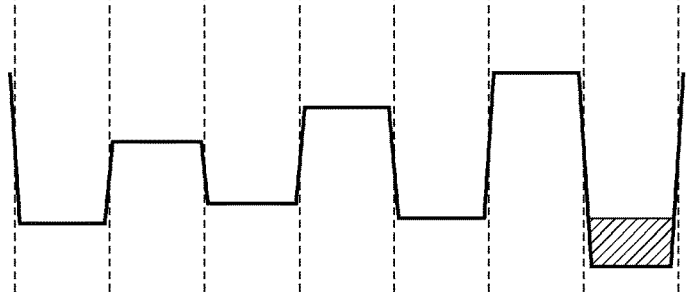

Next, a basic global electronic shutter operation in a photoelectric conversion device will be described using FIG. 4 to FIG. 5F. FIG. 4 is a timing diagram illustrating the drive timing of each control signal in a global electronic shutter operation. FIG. 5A to FIG. 5F are diagrams schematically illustrating potential states of respective portions of the pixel 12 at respective timings. FIG. 5A to FIG. 5F are diagrams illustrating the potential to an electron, and the potential to electrons is higher, that is, the electrical potential is lower in the upper side in FIG. 5A to FIG. 5F. FIG. 5A to FIG. 5F illustrates the electrical potentials of the overflow drain OFD, the transfer transistor M6, the photoelectric converter PD, the transfer transistor M1, the holding portion C1, the transfer transistor M2, and the holding portion C2.

In FIG. 4, the period before the time t1 is an exposure period of the k-th frame. In the period before the time t1, the control signals PTX1 and PTX3 are at the Lo-level, that is, the transfer transistors M1 and M6 are in an off-state, and the potential to electrons in the transfer transistors M1 and M6 part is higher. Thereby, signal charges in accordance with a light amount of an incident light is generated in the photoelectric converter PD, and the generated signal charges are accumulated in the photoelectric converter PD. FIG. 5A illustrates the potential states of respective portions immediately before the time t1.

Note that, in the period before the time t1, the control signal PRES is at the Hi-level, that is, the reset transistor M3 is in an on-state, and the holding portions C2 (FD portion) of all the pixels 12 are in a reset state. Further, the control signal PSEL is at the Lo-level, that is, the select transistor M5 is off-state, and all the pixels 12 are a not-selected state.

At the time t1, the control signals PTX1 on all the rows are controlled from the Lo-level to the Hi-level by the vertical scanning circuit 20, and the transfer transistors M1 of the pixels 12 on all the rows are turned on. Thereby, the potential barrier with respect to electrons of the transfer transistor M1 part decreases, and signal charges accumulated in the photoelectric converter PD are transferred to the holding portion C1. FIG. 5B illustrates the potential states of respective portions at the time t1.

At the time t2, the control signals PTX1 on all the rows are controlled from the Hi-level to the Lo-level by the vertical scanning circuit 20, and the transfer transistors M1 of the pixels 12 on all the rows are turned off. Thereby, the potential barrier with respect to electrons of the transfer transistor M1 part increases, and the transfer operation from the photoelectric converter PD to the holding portion C1 ends. FIG. 5C illustrates the potential states of respective portions at the time t2. The transfer operations to the holding portions C1 are performed at the same time in all the pixels, which defines the end of an exposure period of the k-th frame.

At the time t3, the control signals PTX3 on all the rows are controlled from the Lo-level to the Hi-level by the vertical scanning circuit 20, and the transfer transistors M6 of the pixels 12 on all the rows are turned on. Thereby, the potential barrier with respect to electrons of the transfer transistor M6 part decreases, and signal charges which have remained in the photoelectric converter PD after the transfer operation or have been accumulated in the photoelectric converter PD on and after the time t2 are drained to the overflow drain OFD. FIG. 5D illustrates the potential states of respective portions at the time t3. The charge drain operations to the overflow drain OFD are performed at the same time in all the pixels, which defines the start of the exposure period of the (k+1)-th frame.

At the time t4, the control signals PTX3 on all the rows are controlled from the Hi-level to the Lo-level by the vertical scanning circuit 20, and the transfer transistors M6 of the pixels 12 on all the rows are turned off. Thereby, the potential barrier with respect to electrons of the transfer transistor M6 part increases, and the charge drain operation from the photoelectric converter PD to the overflow drain OFD ends.

In such a way, drain operations of charges to the overflow drains OFD and transfer operations of signal charges to the holding portions C1 are performed at the same time in all the pixels to realize the global electronic shutter function.

Signal charges of the k-th frame transferred to the holding portion C1 of respective pixels 12 are sequentially read out on a row-by-row basis on and after the time t4.

At the time t5, the control signals PRES(n) are controlled from the Hi-level to the Lo-level by the vertical scanning circuit 20, the reset transistors M3 of the pixels 12 on the n-th row are turned off, and the reset of the FD portions is released.

Also, at the time t5, the control signals PSEL(n) are controlled from the Lo-level to the Hi-level by the vertical scanning circuit 20, the select transistors M5 of the pixels 12 on the n-th row are turned on, and the pixels 12 on the n-th row are selected. Thereby, the signals VOUT in accordance with the reset electrical potential of the FD portions of the pixels 12 on the n-th row are output to the vertical output lines 16.

A control signal PTN is controlled to the Hi-level in the subsequent period from the time t6 to the time t7, and thereby reset signals of the pixels 12 on the n-th rows output to the vertical output lines 16 on respective columns are held in sample-hold capacitors used for reset signals included in the readout circuit 30, respectively. The control signal PTN is a control signal for a switch that controls connection and disconnection of the sample-hold capacitor used for the N-signal.

At the time t8, the control signals PTX2(n) is controlled from the Lo-level to the Hi-level by the vertical scanning circuit 20, and the transfer transistors M2 of the pixels 12 on the n-th row are turned on. Thereby, the potential barrier with respect to electrons of the transfer transistor M2 part decreases, and signal charges held in the holding portion C1 are transferred to the holding portion C2. FIG. 5E illustrates the potential states of respective portions at the time t8.

At the time t9, the control signals PTX2(n) are controlled from the Hi-level to the Lo-level by the vertical scanning circuit 20, and the transfer transistors M2 of the pixels 12 on the n-th row are turned off. Thereby, the potential barrier with respect to electrons of the transfer transistor M2 part increases, and the transfer operation from the holding portion C1 to the holding portion C2 ends. FIG. 5F illustrates the potential states of respective portions at the time t9.

Signal charges are transferred to the holding portion C2 of the pixels 12 on the n-th row, thereby the electrical potential of the FD portion of the pixels 12 on the n-th row becomes a level in which the electrical potential in accordance with the amount of transferred signal charges is added to the reset electrical potential, and the signal VOUT in accordance with the electrical potential is output to the vertical output line 16.

A control signal PTS is controlled to the Hi-level in the subsequent period from the time t10 to the time t11, and thereby optical signals of the pixels 12 on the n-th rows output to the vertical output lines 16 on respective columns are held in sample-hold capacitors used for optical signals included in the readout circuit 30, respectively. The control signal PTS is a control signal of a switch that controls connection and disconnection of the sample-hold capacitor used for the S-signal.

The optical signal and the reset signal held in the sample-hold capacitor on each column are transferred to the output circuit 50 on a column basis according to the control signal from the horizontal scanning circuit 40. In the output circuit 50, the reset signal is subtracted from the optical signal, and a signal from which a noise component has been removed is output as a pixel signal.

At the time t12, the control signals PSEL(n) are controlled from the Hi-level to the Lo-level by the vertical scanning circuit 20, and the select transistors M5 of the pixels 12 on the n-th row are turned off. Thereby, the selection of the pixels 12 on the n-th row is released. Further, similarly at the time t12, the control signals PRES(n) are controlled from the Lo-level to the Hi-level by the vertical scanning circuit 20, and the reset transistors M3 of the pixels 12 on the n-th row are turned on. Thereby, the electrical potentials of the FD portions of the pixels 12 on the n-th row are reset.

A series of readout operations over the period from the time t5 to the time t12 are performed on a pixel row basis. In the example of FIG. 4, following to the readout operation of the pixels 12 on the n-th row, a readout operation of the pixels 12 on the (n+1)-th row and a readout operation of the pixels 12 on the (n+2)-th row are sequentially performed.

After the completion of the readout operations of the pixels 12 on all the rows, in a period from the time t13 to the time t14, control signals PTX1 on all the rows are controlled from the Lo-level to the Hi-level by the vertical scanning circuit 20 in a similar manner to the period from the time t1 to the time t2. Thereby, signal charges accumulated in the photoelectric converter PD in the period from the time t4 to the time t 14 are transferred to the holding portion C1. The time t14 defines the end of the exposure period of the (k+1)-th frame.

Here, the period in which readout operations of respective rows are performed is defined as "readout period." FIG. 4 illustrates a readout period of the k-th frame and a readout period of the (k+1)-th frame. On the other hand, the period from the time t4 when draining of charges to the overflow drain OFD is completed to the time t13 when transfer of signal charges to the holding portion C1 is started is a period in which the photoelectric converter PD accumulates signal charges in the subject frame. That is, in FIG. 4, a period from the time t4 to the time t13 is the exposure period of the (k+1)-th frame. Therefore, the readout period of the k-th frame occurs in a period overlapping with the exposure period of the (k+1)-th frame.

In the following description, a timing diagram as illustrated in FIG. 6 may be used instead of the timing diagram as illustrated in FIG. 4, if necessary. While the timing diagram of FIG. 6 illustrates driving at the same timing as that in the timing diagram of FIG. 4, other control signals than the control signals PTX1 and PTX3 are represented by single diagonal dotted lines as "readout signal." This dotted line visually represents that operations on respective rows are sequentially performed. Since the control signals PTX1 and PTX3 are driven at the same time on all the rows, each of the control signals PTX1 and PTX3 is represented by a single signal in FIG. 6.

Figure 7:
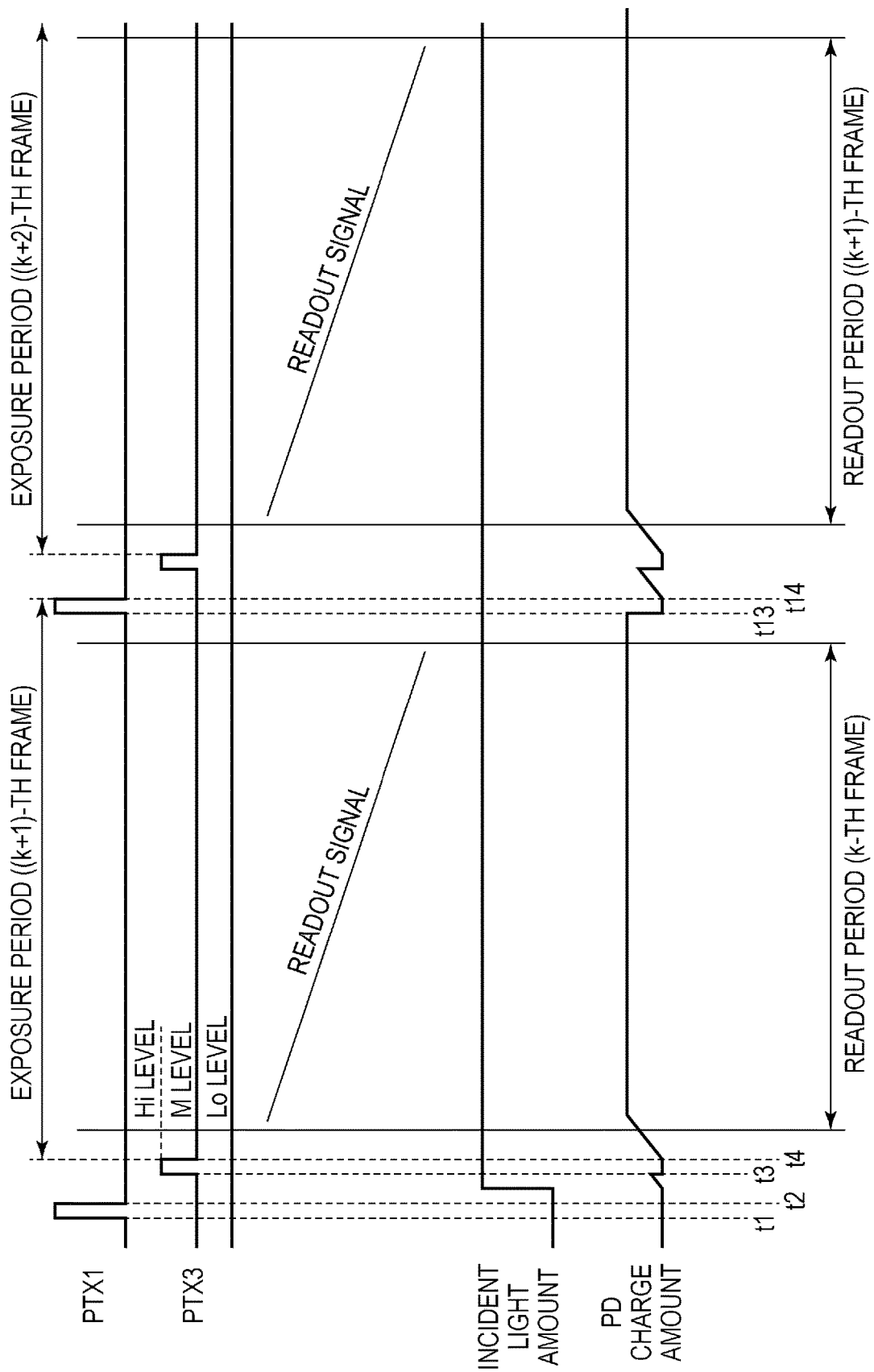
FIG. 7 is a timing diagram illustrating a method of driving a photoelectric conversion device according to a first comparative example.
Figures 9A, 9B:
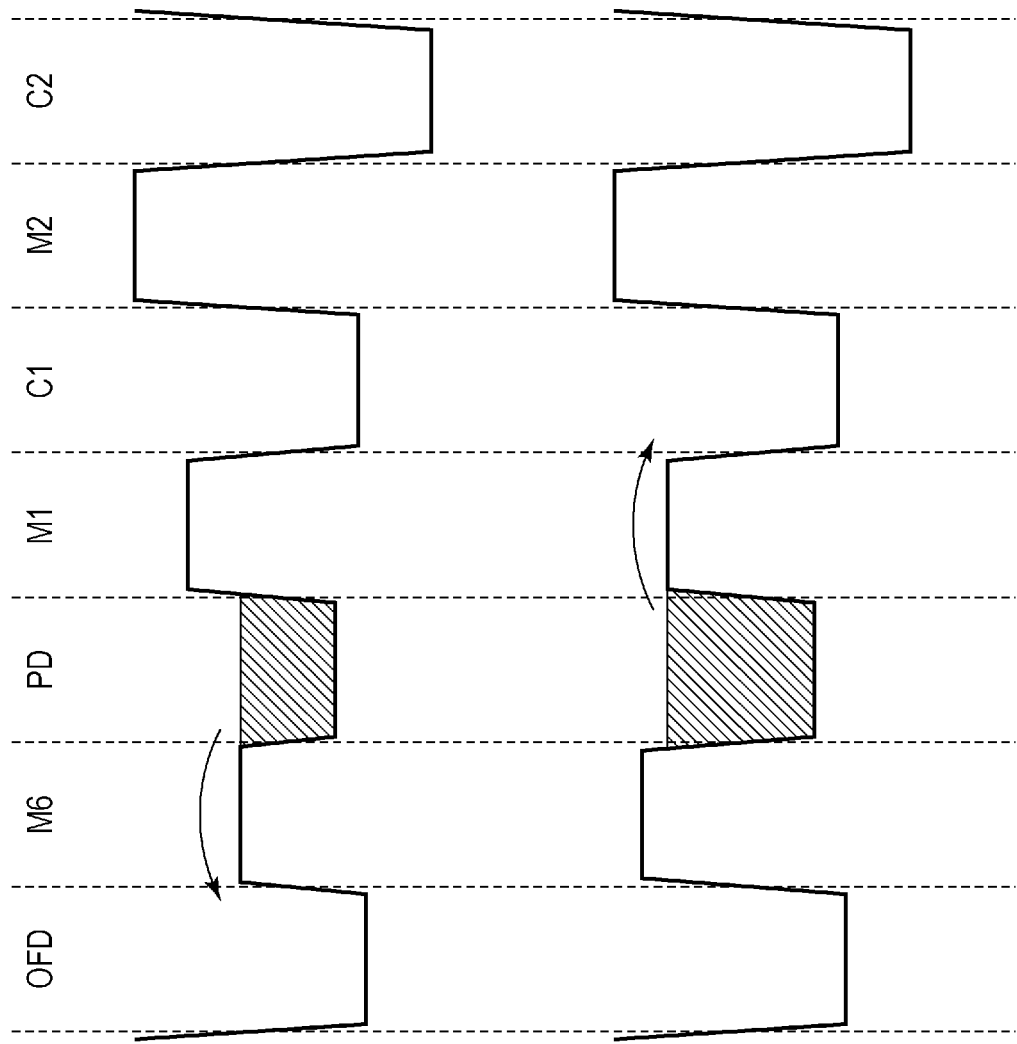
FIG. 9A is a diagram schematically illustrating a change in potential states of respective portions of a pixel in the first comparative example and the second comparative example.
FIG. 9B is a diagram schematically illustrating a change in potential states of respective portions of a pixel in the second comparative example.

Next, a method of driving a photoelectric conversion device according to a first comparative example will be described by using FIG. 7 and FIG. 9A. FIG. 7 is a timing diagram illustrating the method of driving the photoelectric conversion device according to the first comparative example. FIG. 9A schematically illustrates potential states of respective portions of the pixels 12 in the drive method of the first comparative example.

In the drive method of the first comparative example, while the basic operation timing is the same as the drive method illustrated in FIG. 6, the signal level when the control signal PTX3 is off is set to not the Lo-level but an intermediate level (hereafter, denoted as "M-level") between the Lo-level and the Hi-level.

On the lower side of FIG. 7, a light amount of a light entering a particular pixel 12 and an amount of charges (electrons) accumulated in the photoelectric converter PD of the pixel 12 are schematically illustrated. In FIG. 7, such a case is assumed that the light amount of an incident light sharply increases from zero between the time t2 and the time t3 and then a light whose light amount is sufficient to saturate the photoelectric converter PD is continuously entering it.

At the time t4, once the control signal PTX3 is controlled from the Hi-level to the M-level by the vertical scanning circuit 20 and draining of charges to the overflow drain OFD ends, accumulation of charges (electrons) in the photoelectric converter PD, that is, the exposure period of the (k+1)-th frame starts. Since the light amount of an incident light to the photoelectric converter PD is significantly large, the amount of charges accumulated in the photoelectric converter PD immediately reaches the saturation charge amount and then becomes a constant amount.

At the time t13, once the control signal PTX1 is controlled from the Lo-level to the Hi-level by the vertical scanning circuit 20 and charges in the photoelectric converter PD are transferred to the holding portion C1, the photoelectric converter PD becomes empty. Then, in response to the end of the drain period of charges to the overflow drain OFD similar to the period from the time t3 to the time t4, the exposure period of the (k+2)-th frame starts.

FIG. 9A illustrates a potential state when the amount of charges accumulated in the photoelectric converter PD reaches the saturation charge amount. Since the signal level when the transfer transistor M6 is turned off is the M-level, the potential barrier of the transfer transistor M6 is lower than the potential barrier of the transfer transistor M1. Thus, the saturation charge amount of the photoelectric converter PD is defined by the height of the potential barrier of the transfer transistor M6. After the photoelectric converter PD is saturated, overflowed electrons are drained to the overflow drain OFD side having a lower potential barrier.

Accordingly, the drive method of the first comparative example has a problem of reduction in the saturation charge amount of the photoelectric converter PD.

Next, a method of driving a photoelectric conversion device according to a second comparative example will be described by using FIG. 8 and FIG. 9B. FIG. 8 is a timing diagram illustrating the method of driving the photoelectric conversion device according to the second comparative example. FIG. 9B schematically illustrates potential states of respective portions of the pixels 12 in the drive method of the second comparative example.

In the drive method of the second comparative example, while the basic operation timing is the same as the drive method of the first comparative example illustrated in FIG. 7, the signal level when the control signal PTX3 is off is set to not the M-level but the Lo-level. With respect to the light amount of an incident light to the photoelectric converter PD, the same situation as in the first comparative example illustrated in FIG. 7 is assumed.

In the drive method of the second comparative example, since the signal level when the control signal PTX3 is off is the Lo-level and the potential barrier of the transfer transistor M6 is higher than that in the case of the first comparative example, the saturation charge amount of the photoelectric converter PD is larger than that in the case of the first comparative example.

FIG. 9B illustrates a potential state when the amount of charges accumulated in the photoelectric converter PD reaches the saturation charge amount. In the second comparative example, the potential barrier of the transfer transistor M6 is higher than the potential barrier of the transfer transistor M1, and the saturation charge amount of the photoelectric converter PD is defined by the height of the potential barrier of the transfer transistor M1. After the photoelectric converter PD is saturated, overflowed electrons leak into the holding portion C1 side having a lower potential barrier.

As described above, the readout period of the k-th frame occurs in a period overlapping with the exposure period of the (k+1)-th frame. Thus, once leakage of electrons into the holding portion C1 from the photoelectric converter PD occurs in the exposure period of the (k+1)-th frame, a false signal overlaps with a signal of the k-th frame. In FIG. 8, a period in which a false signal is generated is denoted as "false signal generation period."

The exposure period of the k-th frame is a period before the time t1. In the example of FIG. 8, since the light amount of an incident light is zero before the time t1, the original data of the k-th frame is zero. However, when electrons leak into the holding portion C1 from the photoelectric converter PD in the exposure period of the (k+1)-th frame, the leaking electrons are read out as a signal of the k-th frame, and this results in a false signal.

Accordingly, the drive method of the second comparative example has a problem of a false signal superimposing on a signal of the previous frame.

Thus, in the present embodiment, in order to overcome the above problems of the first comparative example and the second comparative example, a photoelectric conversion device is driven in an operation mode that performs global electronic shutter in accordance with a timing diagram illustrated in FIG. 10. FIG. 10 is the timing diagram illustrating a method of driving the photoelectric conversion device according to the present embodiment. The drive method of the present embodiment is the same as the drive methods of the first comparative example and the second comparative example except the operation of the control signal PTX3.

That is, in the present embodiment, at the time t4, the control signal PTX3 is controlled from the Hi-level to a first level that is lower than the Hi-level by the vertical scanning circuit 20 to terminate the period of draining charges to the overflow drain OFD. Then, the control signal PTX3 is continuously changed from a first signal value to a second signal value that is lower than the first signal value by the vertical scanning circuit 20 in the exposure period. Thereby, with respect to signal charges (electrons) held in the photoelectric converter PD, the level of the potential barrier formed by the transfer transistor M6 changes from the first level to a second level that is higher than the first level. In this example, the first level is a level at which the potential of the transfer transistor M6 with respect to charges (electrons) held in the photoelectric converter PD becomes higher than the potential of the photoelectric converter PD. In other words, with the control signal PTX3 at the first level being supplied, the transfer transistor M6 forms a potential barrier with respect to signal charges (electrons) held in the photoelectric converter PD. Further, the second level is preferably a level at which the potential barrier of the transfer transistor M6 with respect to charges (electrons) held in the photoelectric converter PD becomes higher than the first level and lower than or equal to the level of the potential barrier of the transfer transistor M1.

That is, with an exposure period elapsing, the potential barrier of the transfer transistor M6 with respect to electrons gradually increases. In response thereto, the saturation charge amount of the photoelectric converter PD gradually increases, and the amount of electrons accumulated in the photoelectric converter PD gradually increases. In this period, since the potential barrier of the transfer transistor M6 is lower than the potential barrier of the transfer transistor M1, no leakage of electrons into the holding portion C1 from the photoelectric converter PD occurs. The signal level of the control signal PTX3 continuously, gradually decreases so that the height of the potential barrier of the transfer transistor M6 finally becomes the same degree as the height of the potential barrier of the transfer transistor M1 at the end time of the exposure period (time t14). This can ensure the saturation charge amount of the photoelectric converter PD defined by the height of the potential barrier of the transfer transistor M1.

Therefore, in the drive method of the present embodiment, it is possible to prevent generation of a false signal due to leakage of electrons into the holding portion C1 while suppressing reduction in the saturation charge amount of the photoelectric converter PD.

Note that, while the height of the potential barrier of the transfer transistor M6 is controlled by the signal level of the control signal PTX3, that is, the gate electrical potential of the transfer transistor M6 in the present embodiment, it may be controlled by the electrical potential of the overflow drain OFD.

As discussed above, according to the present embodiment, it is possible to prevent occurrence of a false signal due to leakage of electrons into a holding portion from a photoelectric converter while suppressing reduction in the saturation charge amount of the photoelectric converter PD.

[Second Embodiment]

A method of driving a photoelectric conversion device according to a second embodiment of the present invention will be described with reference to FIG. 1 to FIG. 10. Components, control signals, or the like of the photoelectric conversion device illustrated in the first embodiment are labeled with the same reference, and the description thereof will be omitted or simplified.

In the present embodiment, another method of driving the photoelectric conversion device according to the first embodiment illustrated by using FIG. 1 to FIG. 3 will be described. The drive method of the present embodiment is an application example of a case where a gain of an amplifier circuit included in the readout circuit 30 can be selected from a plurality of set values. As an example, such a case is assumed here that the gain of the amplifier circuit can be switched among one-fold, two-fold, four-fold, and eight-fold.

It is assumed that, when the gain is one-fold, the range of the output signal level corresponding to the saturation charge amount determined by the height of the potential barrier on the transfer transistor M1 side of the photoelectric converter PD is equal to the dynamic range of the post-stage circuit. In this case, when the gain is two-fold, the dynamic range of the post-stage circuit will correspond to the range of the output signal level corresponding to the charge amount of half the saturation charge amount of the photoelectric converter PD. That is, when the gain is two-fold or greater, charges of only half or less of the saturation charge amount of the photoelectric converter PD are handled as a final signal.

Thus, in a method of driving the photoelectric conversion device according to the present embodiment, the potential of the transfer transistor M6 part is controlled in accordance with the gain set value of the amplifier circuit. For example, when the gain set value is two-fold or greater, since the light amount of an incident light is relatively small, driving is performed in accordance with the timing diagram of the first comparative example illustrated in FIG. 7. At this time, the M-level of the control signal PTX3 is set to a level such that charges above the amount corresponding to the dynamic range of the post-stage circuit can be accumulated and the potential barrier of the transfer transistor M6 is lower than the potential barrier of the transfer transistor M1. Accordingly, it is possible to ensure a necessary dynamic range while suppressing occurrence of a false signal due to leakage of charges into the holding portion C1 from the photoelectric converter PD.

On the other hand, when the gain set value is one-fold or less, since the light amount of an incident light is relatively larger, either driving is performed in accordance with the timing diagram of the second comparative example illustrated in FIG. 8 tolerating occurrence of a false signal, or driving is performed in accordance with the timing diagram of the first embodiment illustrated in FIG. 10 taking occurrence of a false signal into consideration.

As discussed above, according to the present embodiment, it is possible to ensure a necessary dynamic range while suppressing occurrence of a false signal due to leakage of charges into the holding portion C1 from the photoelectric converter PD even when the gain of the amplifier circuit of the readout circuit 30 is switched in accordance with the light amount of an incident light.

[Third Embodiment]

A method of driving a photoelectric conversion device according to a third embodiment of the present invention will be described with reference to FIG. 11 and FIG. 12. Components, control signals, or the like of the photoelectric conversion device illustrated in the first and second embodiments are labeled with the same reference, and the description thereof will be omitted or simplified. In the present embodiment, another method of driving the photoelectric conversion device according to the first embodiment illustrated by using FIG. 1 to FIG. 3 will be described.

FIG. 11 is a timing diagram illustrating the method of driving the photoelectric conversion device according to the present embodiment. FIG. 11 illustrates transitions of the same control signals as in FIG. 7, FIG. 8, and FIG. 10 and transitions of the incident light amount to the pixel 12 and the accumulation charge amount (electron amount) of the photoelectric converter PD. Illustrated here are a pixel in which the charge amount generated during an exposure period is greater than the saturation charge amount determined by the height of the potential barrier of the transfer transistor M1 (a pixel with an incident light amount corresponding to the saturation charge amount or greater) and a pixel in which the charge amount generated during an exposure period is equal to the saturation charge amount (a pixel with an incident light amount corresponding to the saturation charge amount).

In the method of driving the photoelectric conversion device according to the present embodiment, as illustrated in FIG. 11, at the time t15 in the readout period, the level of the control signal PTX3 is changed stepwise. With such an operation, the false signal generation period can be shorter than that in the case of the second comparative example of FIG. 8, and a false signal can be reduced.

Figure 12:
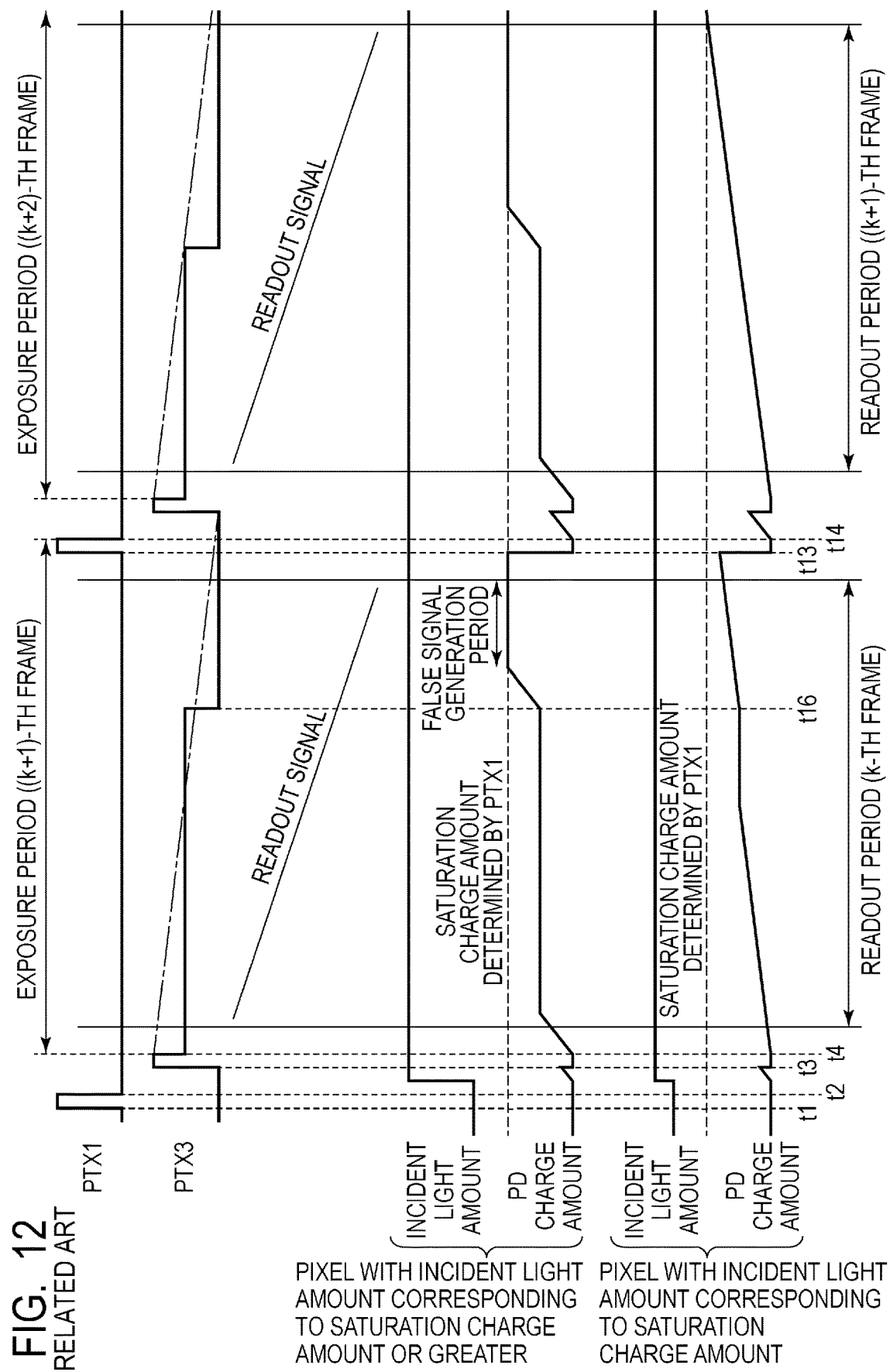
FIG. 12 is a timing diagram illustrating a method of driving a photoelectric conversion device according to a third comparative example.

FIG. 12 is a timing diagram illustrating a method of driving a photoelectric conversion device according to a third comparative example. FIG. 12 illustrates transitions of the control signals and transitions of the incident light amount to the pixel 12 and the charge accumulation amount (electron amount) of the photoelectric converter PD similarly to FIG. 11. Illustrated here are a pixel in which the charge amount generated during an exposure period is greater than the saturation charge amount determined by the height of the potential barrier of the transfer transistor M1 (a pixel with an incident light amount corresponding to the saturation charge amount or greater) and a pixel in which the charge amount generated during an exposure period is equal to the saturation charge amount (a pixel with an incident light amount corresponding to the saturation charge amount).

In the drive method of the third comparative example, at the time t16 after the time t15, the level of the control signal PTX3 is changed stepwise. With such a driving, the false signal generation period can be shorter than that in the case of the present embodiment illustrated in FIG. 11. In the drive method of the third comparative example, however, there is a disadvantage in the operation of the pixel 12 including the photoelectric converter PD which does not reach the saturation charge amount.

In the driving of the present embodiment illustrated in FIG. 11, the amount of charges accumulated in the photoelectric converter PD of the pixel 12 with an incident light amount corresponding to the saturation charge amount reaches the saturation charge amount. In the driving of the third comparative example illustrated in FIG. 12, however, the amount of charges accumulated in the photoelectric converter PD of the pixel 12 with an incident light amount corresponding to the saturation charge amount does not reach the saturation charge amount. This indicates that, by the driving of the third comparative example, no proper output can be obtained in the pixel 12 in which an incident light amount is below the light amount corresponding to the saturation charge amount.

FIG. 11 and FIG. 12 depicts dashed diagonal lines over the timing diagram of the control signal PTX3. The dashed diagonal line indicates a level of the control signal PTX3 for maintaining the potential barrier by which no draining of charges from the photoelectric converter PD to the overflow drain OFD occurs in the pixel 12 in which charges corresponding to the saturation charge amount are accumulated during an exposure period under a constant incident light amount. When there is a period in which the level of the control signal PTX3 exceeds the diagonal line, draining of charges from the photoelectric converter PD to the overflow drain OFD occurs, which results in a reduction in accumulated charges of the photoelectric converter PD.

In the driving of the third comparative example illustrated in FIG. 12, the level of the control signal PTX3 exceeds the diagonal line immediately before the time t3. When draining of charges from the photoelectric converter PD to the overflow drain OFD occurs in the period in which the level of the control signal PTX3 exceeds the diagonal line, the amount of charges accumulated in the photoelectric converter PD of the pixel 12 with an incident light amount corresponding to the saturation charge amount will not reach the saturation charge amount. It is therefore preferable to properly set the timing of the stepwise change in the level of the control signal PTX3 so that the level of the control signal PTX3 does not exceed the diagonal line as in the driving of the present embodiment illustrated in FIG. 11.

Accordingly, it is preferable to properly set the level of the control signal PTX3 in accordance with the light amount of an incident light. Specifically, when there is an incident light corresponding to the saturation charge amount defined by the potential of the transfer transistor M1 during an exposure period, the control signal PTX3 is controlled so that charges accumulated in the photoelectric converter PD does not exceed the potential barrier of the transfer transistor M6.

Note that, while the level of the control signal PTX3 is changed once at the time t15 in the present embodiment, the level of the control signal PTX3 may be changed twice or more in a divided manner.

As discussed above, according to the present embodiment, it is possible to obtain an appropriate output in the pixel 12 in which an incident light amount is below the light amount corresponding to the saturation charge amount and ensure a sufficient saturation charge amount of the photoelectric converter PD.

[Fourth Embodiment]

A method of driving a photoelectric conversion device according to a fourth embodiment of the present invention will be described with reference to FIG. 13. Components, control signals, or the like of the photoelectric conversion device illustrated in the first to third embodiments are labeled with the same reference, and the description thereof will be omitted or simplified. In the present embodiment, another method of driving the photoelectric conversion device according to the first embodiment illustrated by using FIG. 1 to FIG. 3 will be described.

Figure 13:
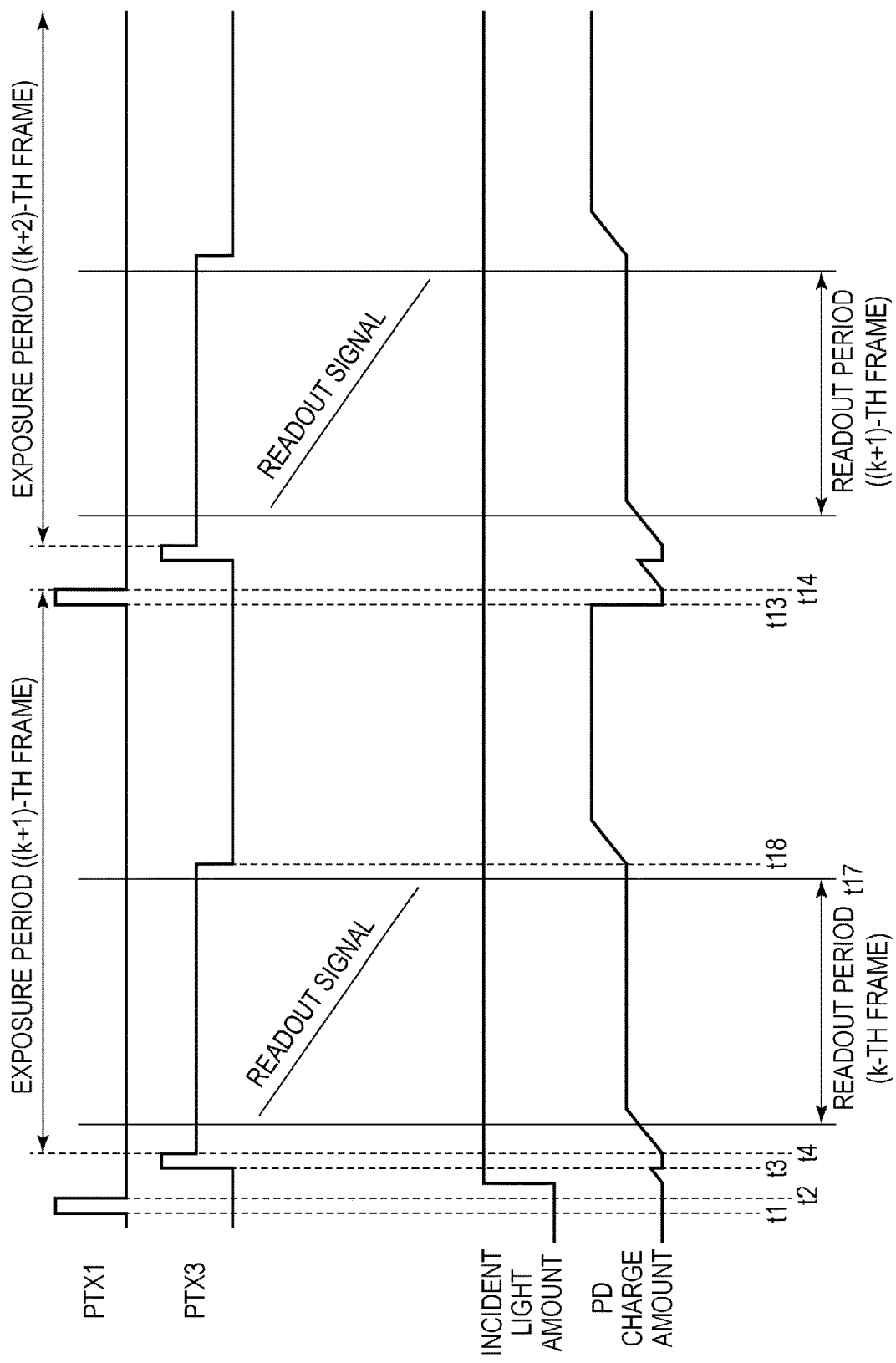
FIG. 13 is a timing diagram illustrating a method of driving a photoelectric conversion device according to a fourth embodiment.

FIG. 13 is a timing diagram illustrating the method of driving the photoelectric conversion device according to the present embodiment. The drive method of the present embodiment illustrates an application example for a case where a readout period is shorter than an exposure period as illustrated in FIG. 13.

As illustrated in FIG. 13, it is assumed that the readout period of the k-th frame ends at the time t17 that is around the middle of the exposure period. In such a case, in the present embodiment, at the time t18 that is slightly after the time t17, the level of the control signal PTX3 is changed stepwise.

From the time t17 to the time t13, the accumulation charge amount of the photoelectric converter PD reaches the saturation charge amount defined by the control signal PTX1, and leakage of charges into the holding portion C1 from the photoelectric converter PD then occurs. However, a readout period of the k-th frame ends at the time t17, and charges leaking into the holding portion C1 from the photoelectric converter PD on and after the time t17 does not result in a false signal.

Accordingly, when the readout period is shorter than the exposure period, occurrence of a false signal can be suppressed by setting the timing at which the level of the control signal PTX3 is changed in accordance with the timing of the end of the readout period.

As discussed above, according to the present embodiment, it is possible to ensure a sufficient saturation charge amount of the photoelectric converter PD while suppressing occurrence of a false signal due to leakage of charges to the holding portion C1 from the photoelectric converter PD.

[Fifth Embodiment]

A method of driving a photoelectric conversion device according to a fifth embodiment of the present invention will be described with reference to FIG. 14. Components, control signals, or the like of the photoelectric conversion device illustrated in the first to fourth embodiments are labeled with the same reference, and the description thereof will be omitted or simplified. In the present embodiment, another method of driving the photoelectric conversion device according to the first embodiment illustrated by using FIG. 1 to FIG. 3 will be described.

Figure 14:
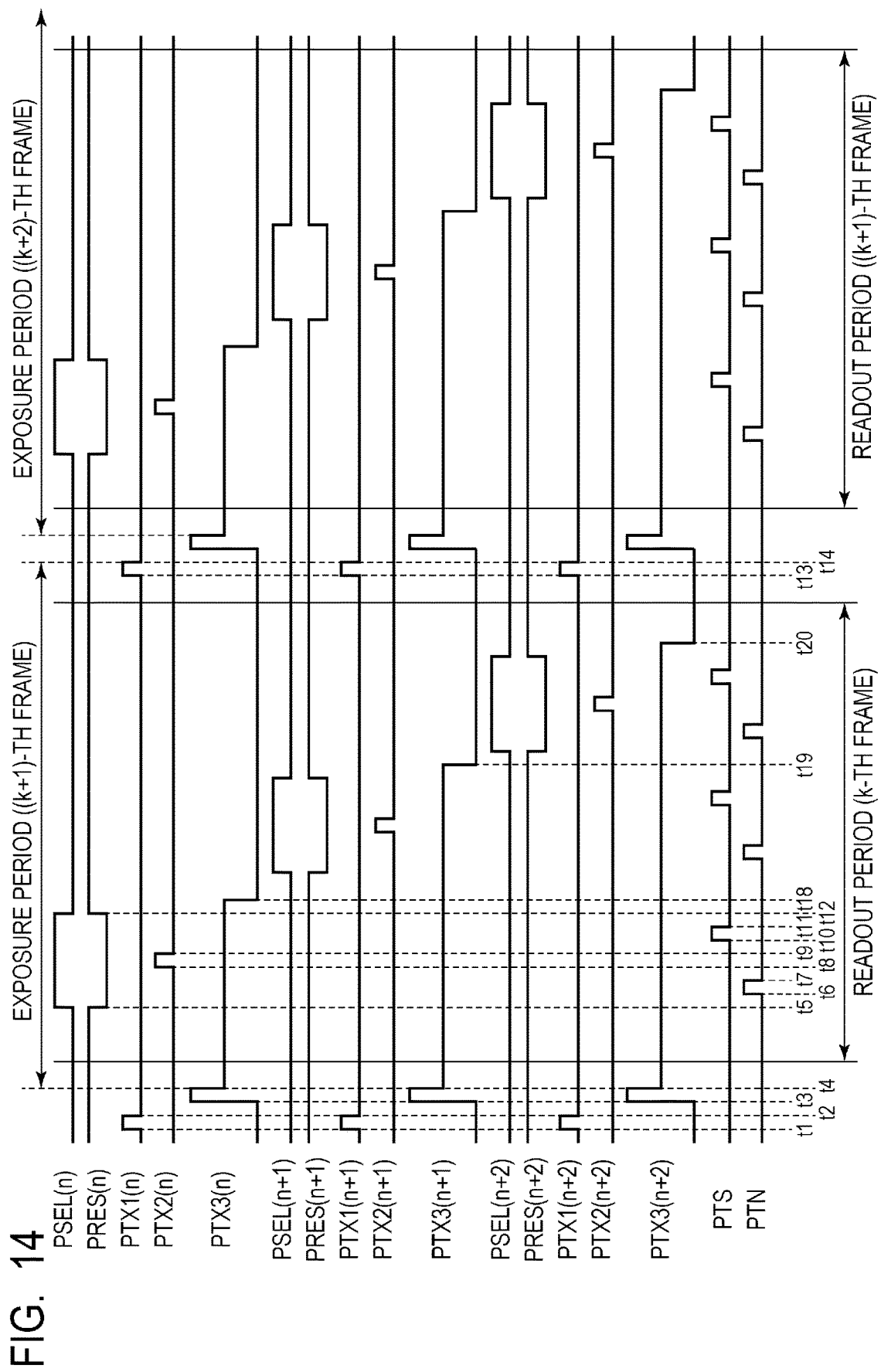
FIG. 14 is a timing diagram illustrating a method of driving a photoelectric conversion device according to a fifth embodiment.

FIG. 14 is a timing diagram illustrating a method of driving a photoelectric conversion device according to the present embodiment. A drive method of the present embodiment is an example in which the change of the level of the control signal PTX3 after the readout period described in the fourth embodiment ends is performed sequentially from pixels on a row where a readout period has ended.

At the time t4, the control signals PTX3 on all the rows are controlled from the Hi-level to the M-level by the vertical scanning circuit 20, and draining of charges from the photoelectric converter PD to the overflow drain OFD is completed. The level of the control signals PTX3 are maintained at the M-level until the readout periods of respective pixel rows end.

For example, on the n-th pixel row, the control signal PTX3(n) is maintained at the M-level until the time t12 when the readout operation is completed, and the control signal PTX3(n) is changed to the Lo-level at the time t18 immediately after the time t12. Since the readout operation on the n-th pixel row is completed at the time t12, charges leaking into the holding portion C1 from the photoelectric converter PD after the time t12 does not result in a false signal.

Similarly, on the (n+1)-th pixel row, the control signal PTX3(n+1) is changed to the Lo-level at the time t19 after the readout operation on the pixel row is completed. Further, on the (n+2)-th pixel row, the control signal PTX3(n+2) is changed to the Lo-level at the time t20 after the readout operation on the pixel row is completed.

As discussed above, according to the present embodiment, it is possible to ensure a sufficient saturation charge amount of the photoelectric converter PD while suppressing occurrence of a false signal due to leakage of charges into the holding portion C1 from the photoelectric converter PD.

[Sixth Embodiment]

A method of driving a photoelectric conversion device according to a sixth embodiment of the present invention will be described with reference to FIG. 15 and FIG. 16. Components, control signals, or the like of the photoelectric conversion device illustrated in the first to fifth embodiments are labeled with the same reference, and the description thereof will be omitted or simplified. In the present embodiment, another method of driving the photoelectric conversion device according to the first embodiment illustrated by using FIG. 1 to FIG. 3 will be described.

Figure 15:
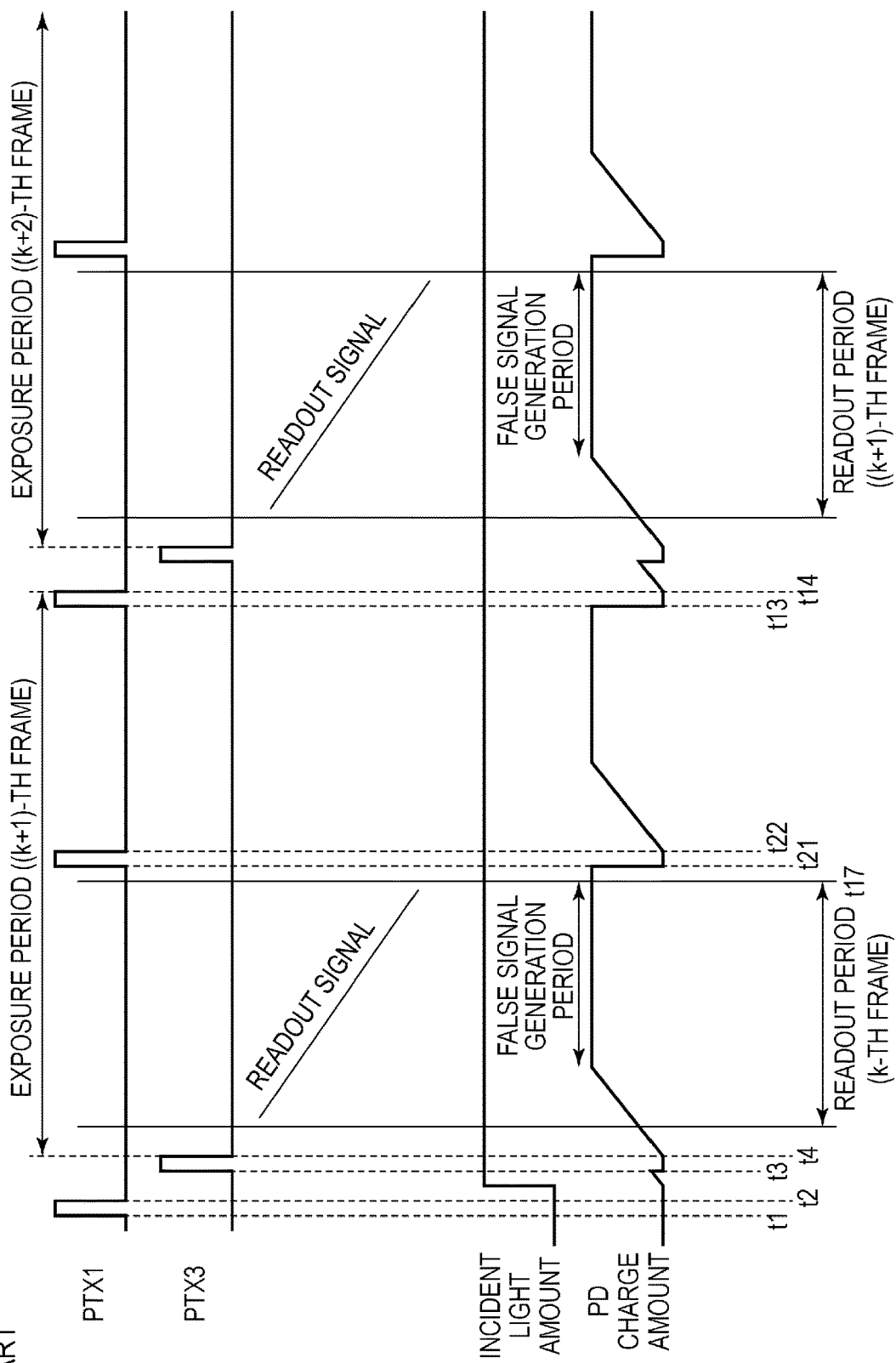
FIG. 15 is a timing diagram illustrating a method of driving a photoelectric conversion device according to a fourth comparative example.

FIG. 15 is a timing diagram illustrating a method of driving a photoelectric conversion device according to a fourth comparative example. The fourth comparative example is an example of driving in which multiple times (twice in this example) of transfer of charges from the photoelectric converter PD to the holding portion C1 are performed during one frame of an exposure period. That is, one frame of an exposure period is divided into a plurality of periods partitioned by a transfer operation of charges from the photoelectric converter PD to the holding portion C1.

In the fourth comparative example, a case where a readout period is shorter than an exposure period is assumed in the same manner as the case of the fourth embodiment. In this example, the readout period of the k-th frame has ended by the time t17 that is before the time 21 around the middle of the exposure period of the (k+1)-th frame that starts the time t4 and ends the time t14.

In the period from the time t21 to the time t22 after the readout period of the k-th frame has ended, the control signal PTX1 is controlled from the Lo-level to the Hi-level on all the rows by the vertical scanning circuit 20. Thereby, charges accumulated in the photoelectric converter PD in the period from the time t4 to the time t22 (first exposure period) are transferred to the holding portion C1. This transfer operation is referred to as first transfer. In the transfer operation from the photoelectric converter PD to the holding portion C1 performed between the time t13 to the time t14, charges accumulated in the photoelectric converter PD in the period from the time t22 to the time t14 (second exposure period) are transferred to the holding portion C1. This transfer operation is referred to as second transfer. In this example, the period denoted as "false signal generation period" in FIG. 15 and FIG. 16 is a period in which a false signal may occur. Since the second exposure period occurs after the end of the readout period, no false signal is caused even when the photoelectric converter PD is saturated.

Figure 16:
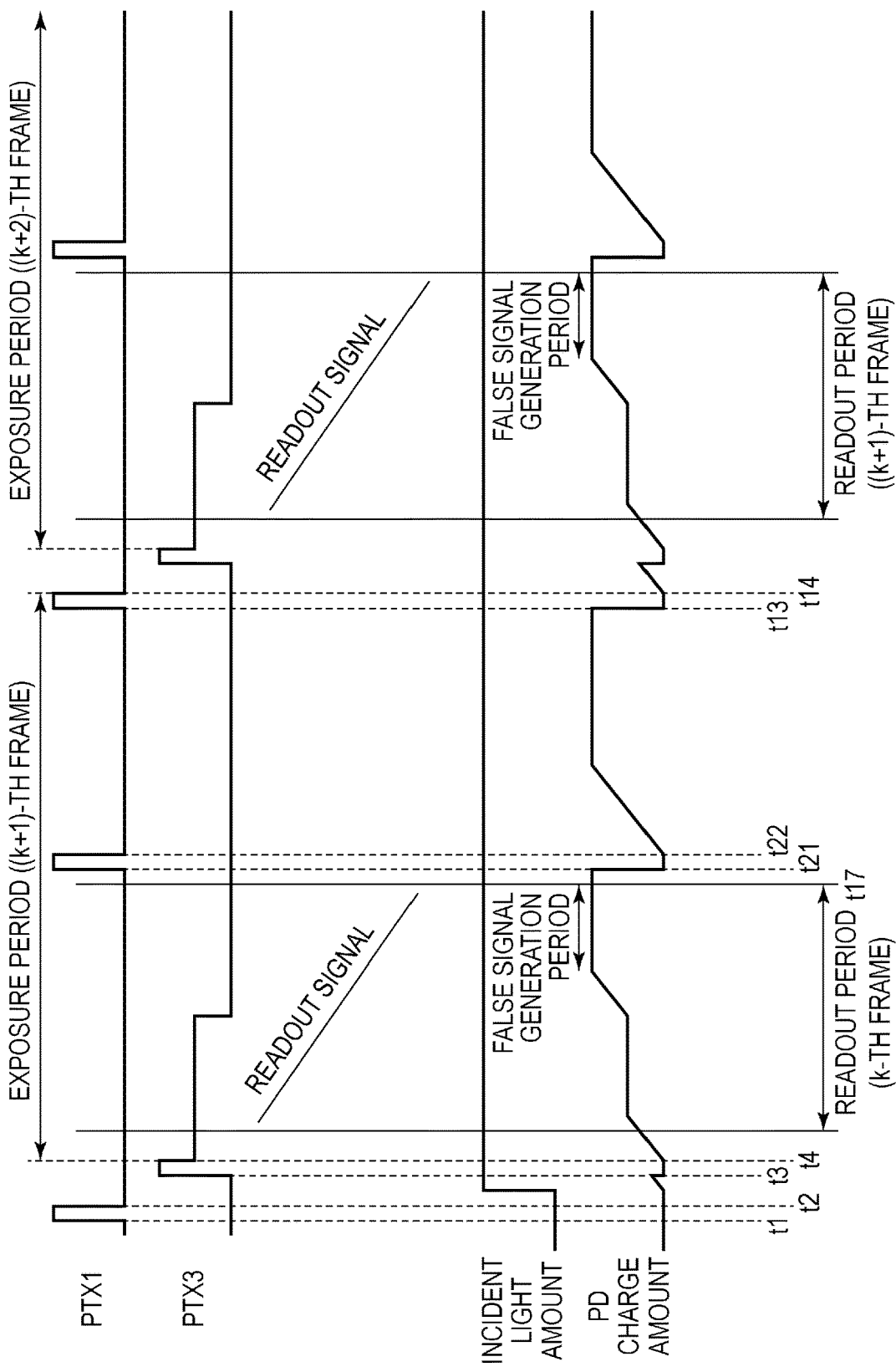
FIG. 16 is a timing diagram illustrating a method of driving a photoelectric conversion device according to a sixth embodiment.

FIG. 16 is a timing diagram illustrating the method of driving the photoelectric conversion device according to the present embodiment. The driving in the present embodiment is the same as the driving in the fourth comparative example illustrated in FIG. 15 except the driving of the control signal PTX3.

In the drive method of the present embodiment, as illustrated in FIG. 16, the level of the control signal PTX3 is changed stepwise in the middle of the first exposure period in the same manner as the drive method of the third embodiment. With such an operation, the false signal generation period can be shorter than in the case of the fourth comparative example of FIG. 15, and the false signal can be reduced. Further, the number of times of transfer from the photoelectric converter PD to the holding portion C1 is two, and thereby the saturation charge amount of the photoelectric converter PD can be substantially doubled.

As discussed above, according to the present embodiment, it is possible to ensure a sufficient saturation charge amount of the photoelectric converter PD while suppressing occurrence of a false signal due to leakage of charges into the holding portion C1 from the photoelectric converter PD.

[Seventh Embodiment]

A method of driving a photoelectric conversion device according to a seventh embodiment of the present invention will be described with reference to FIG. 17. Components, control signals, or the like of the photoelectric conversion device illustrated in the first to sixth embodiments are labeled with the same reference, and the description thereof will be omitted or simplified. In the present embodiment, another method of driving the photoelectric conversion device according to the first embodiment illustrated by using FIG. 1 to FIG. 3 will be described.

Figure 17:
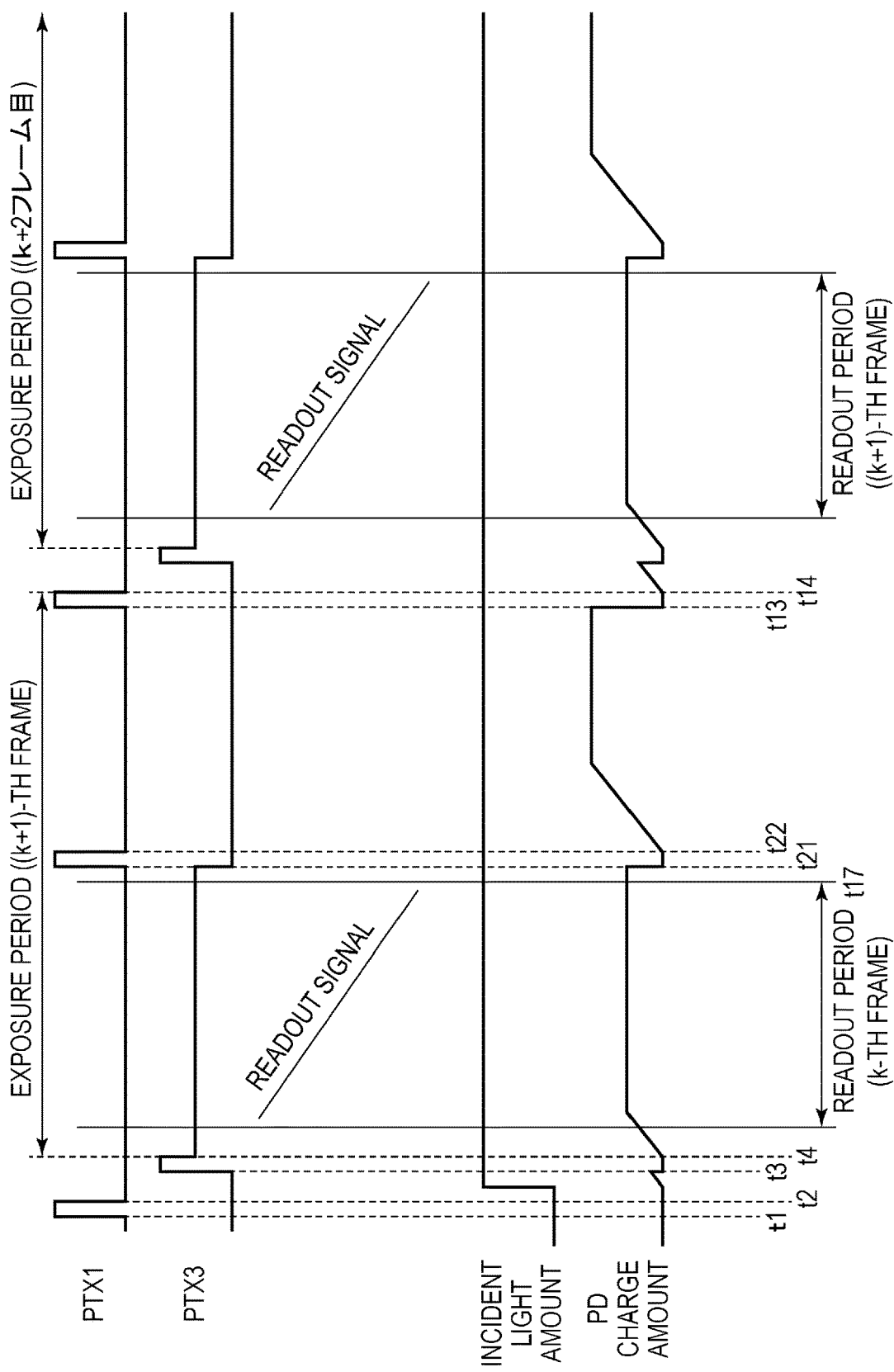
FIG. 17 is a timing diagram illustrating a method of driving a photoelectric conversion device according to a seventh embodiment.

FIG. 17 is a timing diagram illustrating the method of driving the photoelectric conversion device according to the present embodiment. The driving in the present embodiment is the same as the driving in the fourth comparative example illustrated in FIG. 15 except the driving of the control signal PTX3.

In the drive method of the present embodiment, as illustrated in FIG. 17, the control signal PTX3 is changed stepwise at the time t21 that is a boundary between the first exposure period and the second exposure period. In such an operation, while the saturation charge amount of the photoelectric converter PD in the first exposure period is less than that in the case of the fourth comparative example, the false signal generation period can be eliminated. The saturation charge amount of the photoelectric converter PD in the second exposure period is maintained to the original saturation charge amount in accordance with the level of the control signal PTX1.

As discussed above, according to the present embodiment, it is possible to ensure a certain saturation charge amount of the photoelectric converter PD while suppressing occurrence of a false signal due to leakage of charges into the holding portion C1 from the photoelectric converter PD.

[Eighth Embodiment]

A method of driving a photoelectric conversion device according to an eighth embodiment of the present invention will be described with reference to FIG. 18 and FIG. 19. Components, control signals, or the like of the photoelectric conversion device illustrated in the first to seventh embodiments are labeled with the same reference, and the description thereof will be omitted or simplified. In the present embodiment, another method of driving the photoelectric conversion device according to the first embodiment illustrated by using FIG. 1 to FIG. 3 will be described.

In the method of driving the photoelectric conversion device according to the fourth embodiment, when a readout period is shorter than an exposure period, occurrence of a false signal is suppressed by changing the control signal PTX3 from the M-level to the Lo-level after the end of the readout period. In the drive method of the fourth embodiment, however, another problem may occur when an object changes from a bright state to a dark state.

Figure 18:
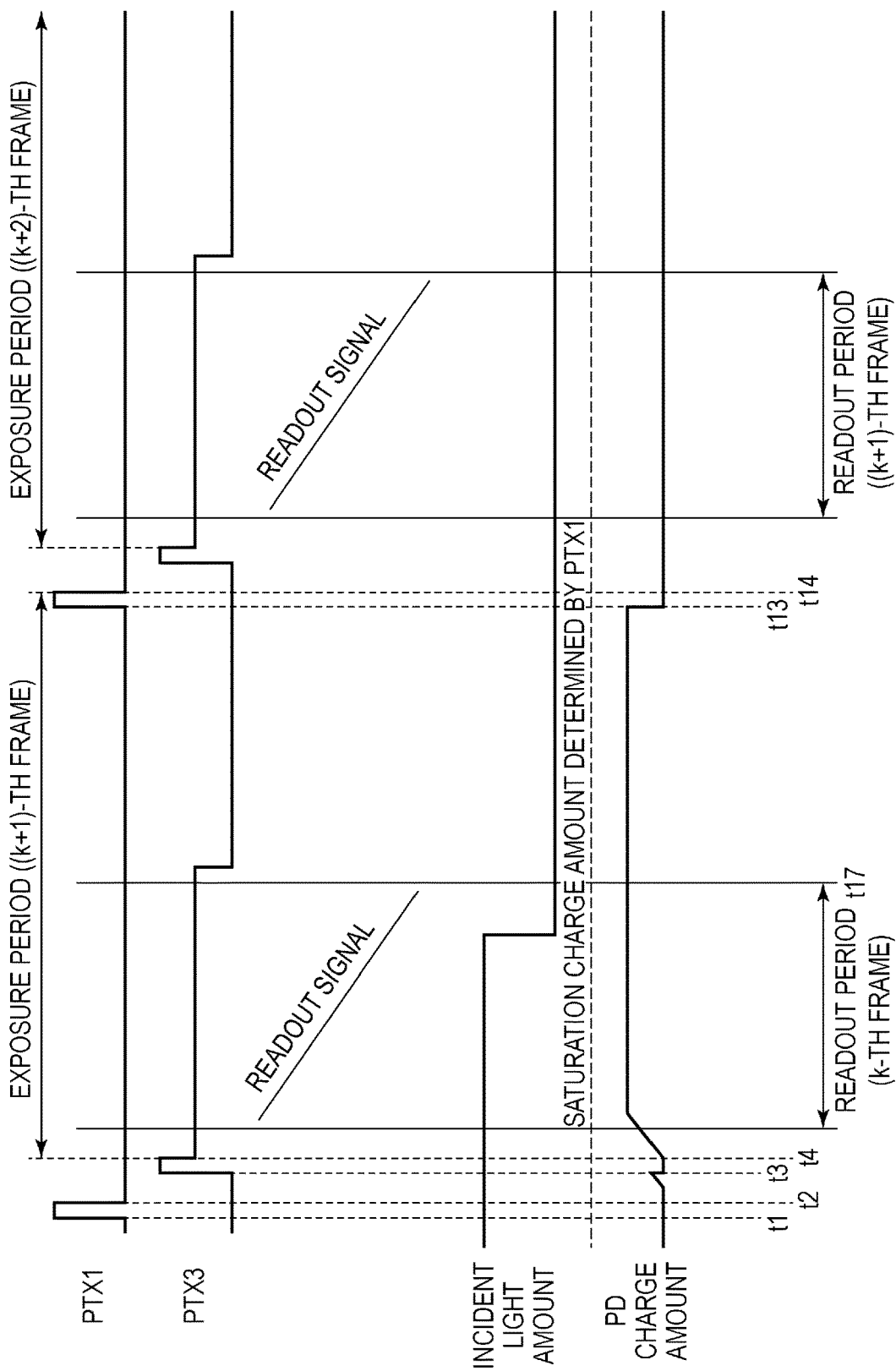
FIG. 18 is a timing diagram illustrating an object of the method of driving the photoelectric conversion device according to the fourth embodiment.

FIG. 18 is a timing diagram illustrating the problem of the method of driving the photoelectric conversion device according to the fourth embodiment. FIG. 18 illustrates a case where a state of a large light amount of an incident light changes to a state of a small light amount in the readout period of the k-th frame in the driving in the fourth embodiment.

In FIG. 18, the charge amount accumulated in the photoelectric converter PD is supposed to reach the saturation charge amount determined by the control signal PTX1. During a readout period, however, because of the M-level of the control signal PTX3, the charge amount accumulated in the photoelectric converter PD remains at a lower charge amount than the saturation charge amount defined by the control signal PTX3. After the end of a readout period, while the control signal PTX3 is set to the Lo-level, the incident light amount is already small at this time and no further charge accumulation is performed. As a result, the charge amount finally accumulated in the photoelectric converter PD does not reach the saturation charge amount determined by the control signal PTX1.

Thus, in the method of driving the photoelectric conversion device according to the present embodiment, pixels used for image capture and pixels used for correction are prepared as a plurality of pixels 12 forming the imaging region 10. Then, the pixels 12 used for correction are driven in accordance with the timing diagram illustrated in FIG. 19. It is desirable for the pixels 12 used for correction to be distributed within the imaging region 10.

Figure 19:
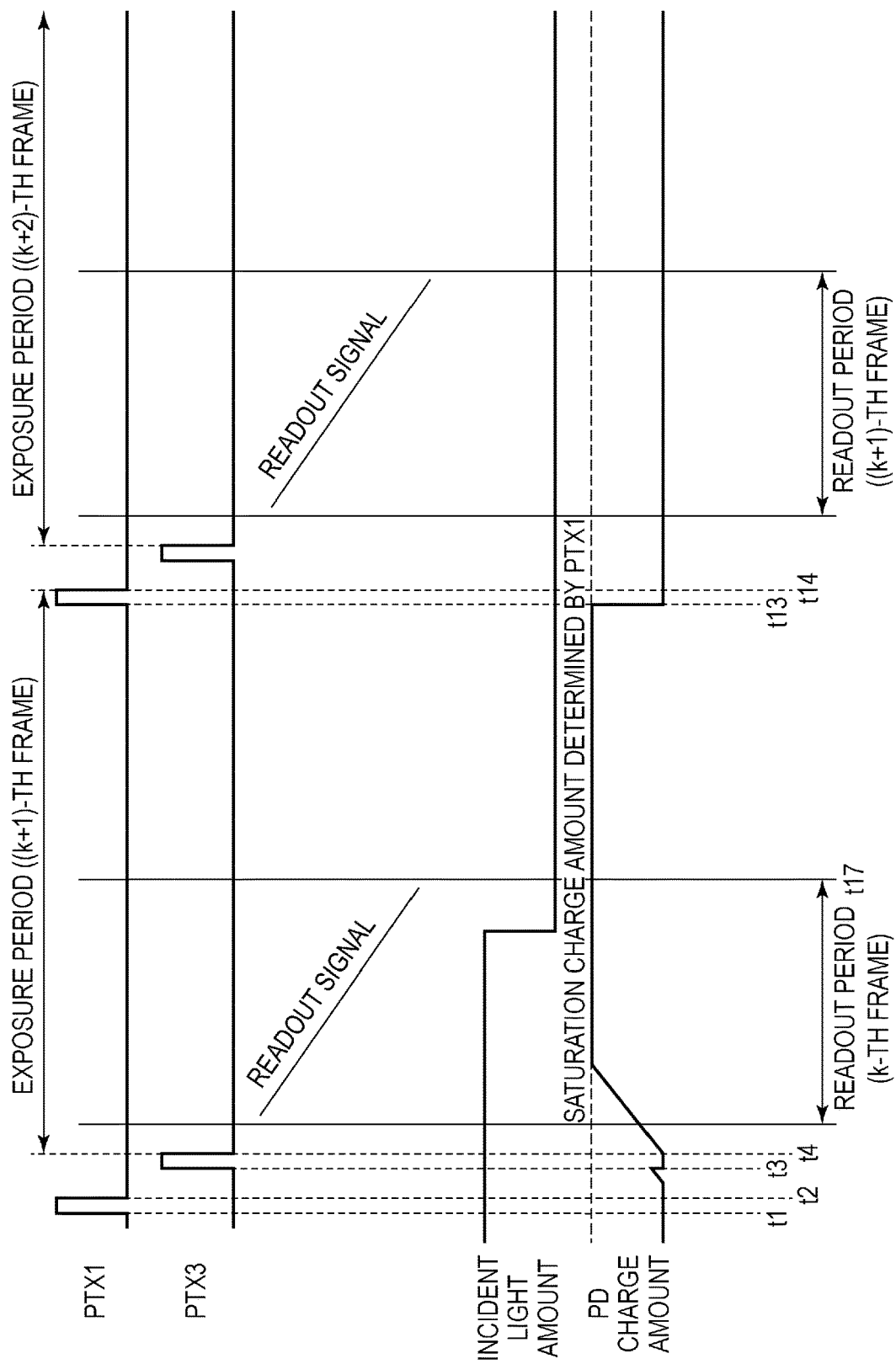
FIG. 19 is a timing diagram illustrating a method of driving a photoelectric conversion device according to an eighth embodiment.

FIG. 19 is a timing diagram illustrating the method of driving the photoelectric conversion device according to the present embodiment. In the driving in the present embodiment illustrated in FIG. 19, the control signal PTX3 is set to the Lo-level during an exposure period for the pixel 12 used for correction. That is, the potential barrier of the transfer transistor M6 part is controlled to a level above the potential barrier of the transfer transistor M1 part. Thereby, in the pixel 12 used for correction, the output level which is supposed to be can be obtained even when a state of a large light amount of an incident light is changed to a state of a small light amount during a readout period.

The output of the pixel 12 used for correction is used to correct the output of a pixel from which the output level which is supposed to be has not been obtained. For example, such a scheme or the like can be applied that multiplies the parameter, which depends on a shading shape of the output of the pixel 12 used for correction, by the output of the pixel 12 other than that for correction. Note that, for example, correction of a pixel signal can be performed in a signal processing unit 208 in an imaging system according to a twelfth embodiment described later or in an image processing unit 312 in an imaging system according to a thirteenth embodiment described later.

As discussed above, according to the present embodiment, it is possible to correct image quality deterioration when an incident light amount changes from a bright state to a dark state in addition to ensuring a saturation charge amount of the photoelectric converter PD while suppressing occurrence of a false signal due to leakage of charges into the holding portion C1 from the photoelectric converter PD.

[Ninth Embodiment]

A method of driving a photoelectric conversion device according to a ninth embodiment of the present invention will be described by using FIG. 20. Components, control signals, or the like of the photoelectric conversion device illustrated in the first to eighth embodiments are labeled with the same reference, and the description thereof will be omitted or simplified. In the present embodiment, another method of driving the photoelectric conversion device according to the first embodiment illustrated by using FIG. 1 to FIG. 3 will be described.

In the present embodiment, in a similar manner to the eighth embodiment, a countermeasure to the problem that may occur when an object changes from a bright state to a dark state will be described. In the method of driving a photoelectric conversion device according to the present embodiment, the pixels 12 used for correction are driven in accordance with the timing diagram illustrated in FIG. 20.

Figure 20:
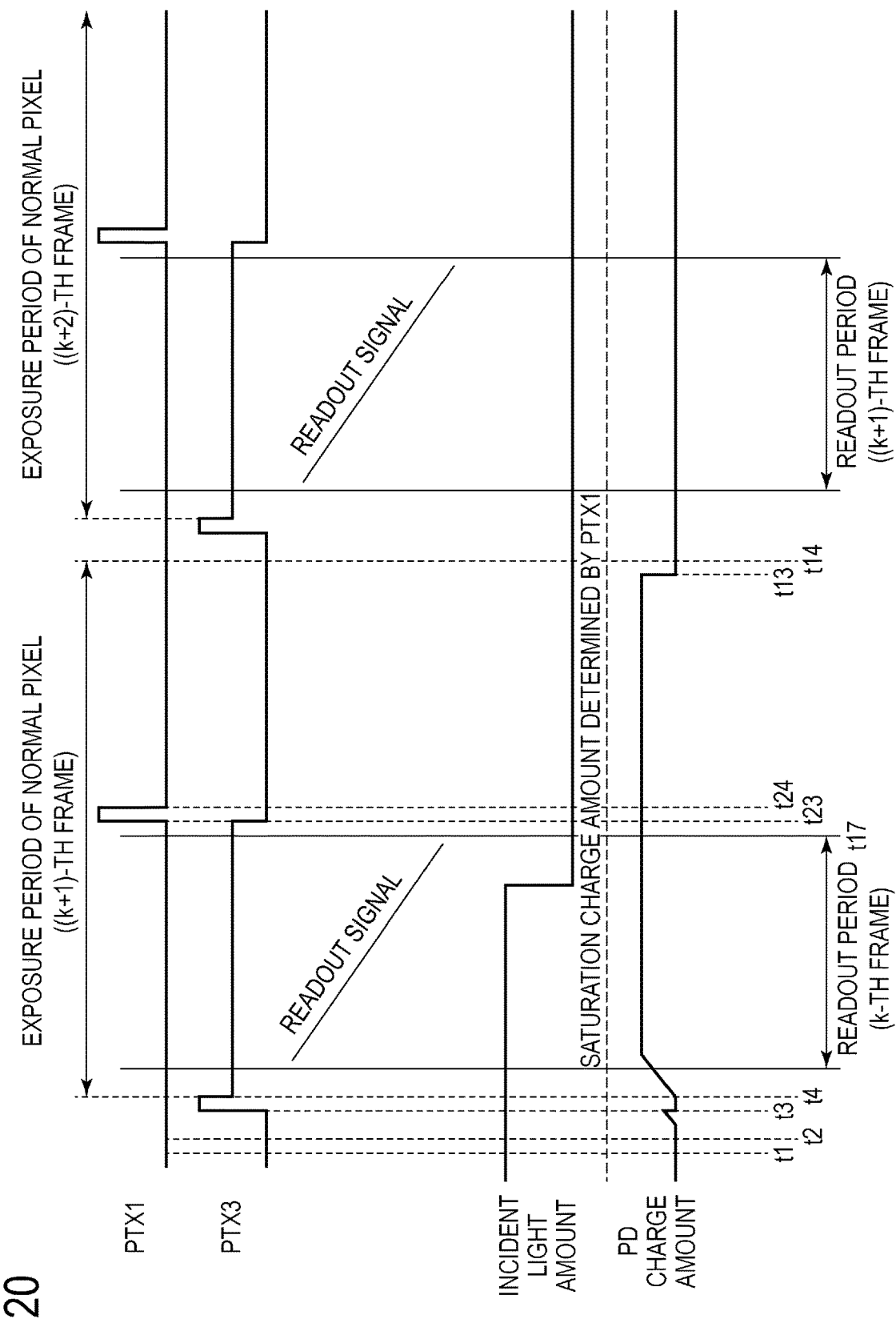
FIG. 20 is a timing diagram illustrating a method of driving a photoelectric conversion device according to a ninth embodiment.

FIG. 20 is a timing diagram illustrating the method of driving the photoelectric conversion device according to the present embodiment. In the driving in the present embodiment, as illustrated in FIG. 20, the timing of transfer of charges from the photoelectric converter PD to the holding portion C1 is different between the pixels 12 used for correction and other pixels 12. That is, in the pixel 12 used for correction, the control signal PTX1 is controlled to the Hi-level in the period from the time t23 to the time t24 in the middle of an exposure period of other pixels 12 to transfer charges from the photoelectric converter PD to the holding portion C1. That is, an exposure period used for a correction signal applied to the pixel 12 used for correction is controlled in a shorter time than an exposure period of other pixels 12. With such an operation, signals based on charges accumulated during a former period of the exposure period of other pixels 12 are output from the pixels 12 used for correction.

The output of the pixels 12 used for correction is used to correct the output of other pixels 12 from which the output level which is supposed to be has not been obtained. For example, such a scheme can be applied that, when the output of the pixel 12 used for correction is above a certain amount, replaces outputs of other pixels 12 than that used for correction arranged in the periphery thereof with a level in accordance with the saturation charge amount of the photoelectric converter PD. Note that, for example, correction of a pixel signal can be performed in the signal processing unit 208 in the imaging system according to the twelfth embodiment described later or in the image processing unit 312 in the imaging system according to the thirteenth embodiment described later.

As discussed above, according to the present embodiment, it is possible to correct image quality deterioration when an incident light amount changes from a bright state to a dark state in addition to ensuring a saturation charge amount of the photoelectric converter PD while suppressing occurrence of a false signal due to leakage of charges into the holding portion C1 from the photoelectric converter PD.

[Tenth Embodiment]

A method of driving a photoelectric conversion device according to a tenth embodiment of the present invention will be described by using FIG. 21A and FIG. 21B. Components, control signals, or the like of the photoelectric conversion device illustrated in the first to ninth embodiments are labeled with the same reference, and the description thereof will be omitted or simplified. In the present embodiment, another method of driving the photoelectric conversion device according to the first embodiment illustrated by using FIG. 1 to FIG. 3 will be described.

In the present embodiment, in a similar manner to the eighth and ninth embodiments, a countermeasure to the problem that may occur when an object changes from a bright state to a dark state will be described. In the method of driving the photoelectric conversion device according to the present embodiment, image quality deterioration is detected based on an output image, and the correction thereof is performed.

Figure 21A:
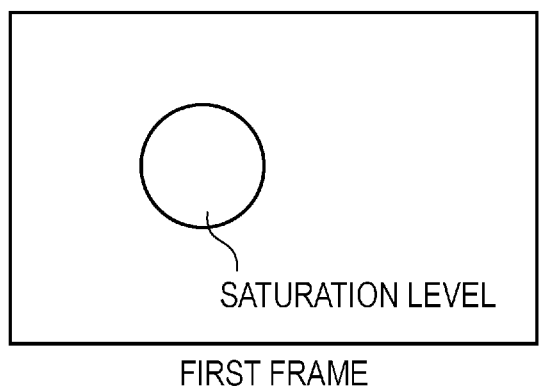
FIG. 21A and FIG. 21B are diagrams illustrating a method of driving a photoelectric conversion device according to a tenth embodiment.
Figure 21B:
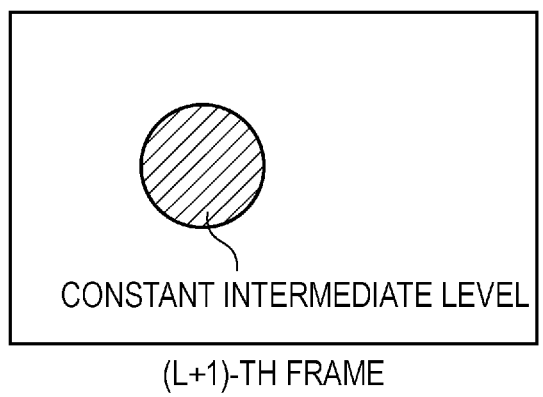

FIG. 21A is a diagram illustrating an example of an output image of the L-th frame, and FIG. 21B is a diagram illustrating an example of an output image of the (L+1)-th frame. In the L-th frame, a light emitting object such as a lamp emits a light, and as illustrated in FIG. 21A, the output of a region depicted with a circle therein is at the saturation level of the photoelectric converter PD. In the (L+1)-th frame, while the lamp is turned off, as illustrated in FIG. 21B, the output of the region depicted with a circle therein is at a constant intermediate level. The output in the (L+1)-th frame being at the intermediate level represents that a state of a large light amount of an incident light changes to a state of a small light amount during the readout period of the L-th frame.

In the present embodiment, when a certain size of a region of an output image is at a saturation level in the L-th frame and at an intermediate level in the next (L+1)-th frame, the output of the region of the (L+1)-th frame is corrected to a saturation level. In such a way, image quality deterioration occurring when an object changes from a bright state to a dark state can be reduced. Note that, for example, correction of a pixel signal can be performed in the signal processing unit 208 in the imaging system according to the twelfth embodiment described later or in the image processing unit 312 in the imaging system according to the thirteenth embodiment described later.

As discussed above, according to the present embodiment, it is possible to correct image quality deterioration when an incident light amount changes from a bright state to a dark state in addition to ensuring a saturation charge amount of the photoelectric converter PD while suppressing occurrence of a false signal due to leakage of charges into the holding portion C1 from the photoelectric converter PD.

[Eleventh Embodiment]

A photoelectric conversion device and a method of driving the same according to an eleventh embodiment of the present invention will be described by using FIG. 22. Components, control signals, or the like of the photoelectric conversion device illustrated in the first to tenth embodiments are labeled with the same reference, and the description thereof will be omitted or simplified.

In the present embodiment, in a similar manner to the eighth to tenth embodiments, a countermeasure to the problem that may occur when an object changes from a bright state to a dark state will be described.

Figure 22:
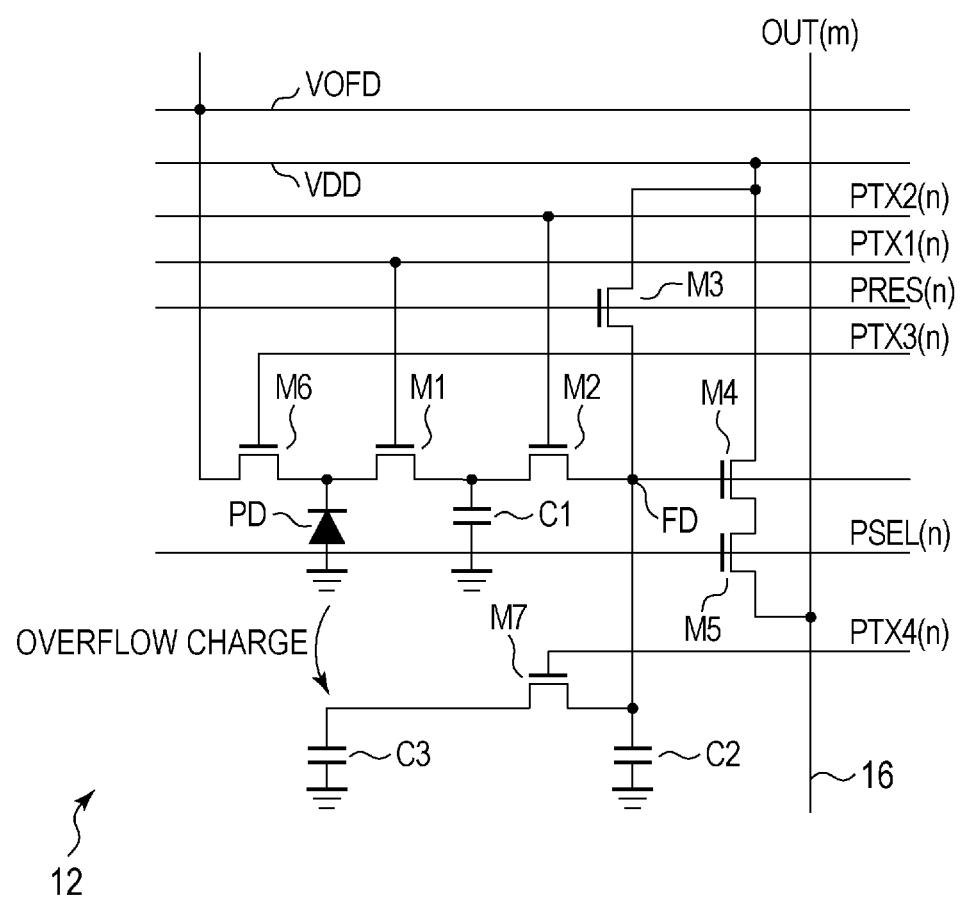
FIG. 22 is a circuit diagram illustrating a configuration example of a pixel of a photoelectric conversion device according to an eleventh embodiment.

In the photoelectric conversion device according to the present embodiment, each of the pixels 12 forming the imaging region 10 is formed of the circuit illustrated in FIG. 22. FIG. 22 is a circuit diagram illustrating a configuration example of the pixel 12 of the photoelectric conversion device according to the present embodiment.

As illustrated in FIG. 22, the pixel 12 of the photoelectric conversion device further has a transfer transistor M7 and a holding portion C3 in addition to the photoelectric converter PD, the transfer transistors M1, M2, and M6, the reset transistor M3, the amplifier transistor M4, the select transistor M5, and the holding portions C1 and C2. The drain of the transfer transistor M7 is connected to the FD node. The node of the source of the transfer transistor M7 includes a capacitance component and has a function as a holding portion of charges. FIG. 22 represents this capacitance as a capacitor element (C3) whose one terminal is connected to the node. In the following description, this capacitor element may be denoted as the holding portion C3. The other terminal of the capacitor element forming the holding portion C3 is grounded.

In the pixel 12 illustrated in FIG. 22, such potential design that a part of charges overflowed from the transfer transistor M6 side leaks into the holding portion C3. That is, the holding portion C3 collects and holds at least a part of charges overflowed from the photoelectric converter PD. The signal based on the held charges in the holding portion C3 can be read out by being transferred to the holding portion C2 via the transfer transistor M7.

Also in the photoelectric conversion device according to the present embodiment, basically, such driving is performed that ensures a saturation charge amount of the photoelectric converter PD while suppressing occurrence of a false signal due to leakage of charges into the holding portion C1 from the photoelectric converter PD as illustrated in FIG. 13 or FIG. 18, for example. In the example of driving illustrated in FIG. 18, charges leak into the transfer transistor M6 side from the photoelectric converter PD during a readout period of the k-th frame. A part of such leaking charges is held in the holding portion C3.

In the present embodiment, charges held in the holding portion C3 are utilized as signal charges to overcome the above-described problem occurring when an object changes from a bright state to a dark state. For example, such a scheme or the like can be applied that adds a signal based on charges held in the holding portion C1 and a signal based on a signal held in the holding portion C3 with weighting if necessary when an object changes from a bright state to a dark state. Note that, for example, correction of a pixel signal can be performed in the signal processing unit 208 in the imaging system according to the twelfth embodiment described later or in the image processing unit 312 in the imaging system according to the thirteenth embodiment described later.

As discussed above, according to the present embodiment, it is possible to correct image quality deterioration when an incident light amount changes from a bright state to a dark state in addition to ensuring a saturation charge amount of the photoelectric converter PD while suppressing occurrence of a false signal due to leakage of charges into the holding portion C1 from the photoelectric converter PD.

[Twelfth Embodiment]

Figure 23:
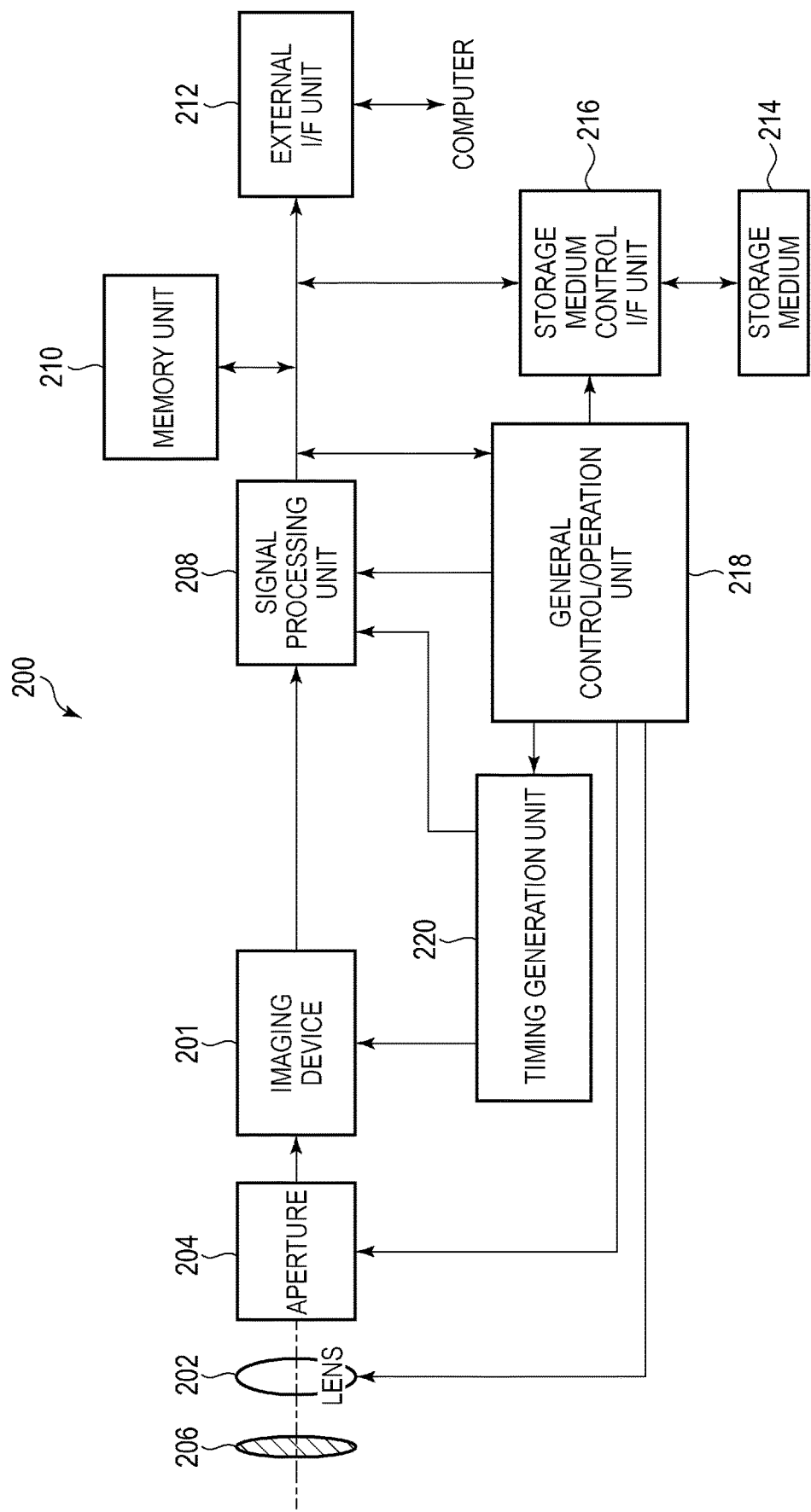
FIG. 23 is a block diagram illustrating a general configuration of an imaging system according to a twelfth embodiment.

An imaging system according to the twelfth embodiment of the present invention will be described with reference to FIG. 23. Components of the photoelectric conversion device illustrated in the first to eleventh embodiments are labeled with the same reference, and the description thereof will be omitted or simplified. FIG. 23 is a block diagram illustrating a general configuration of the imaging system according to the present embodiment.

The photoelectric conversion devices 100 described in the above first to eleventh embodiments can be applied to various imaging systems. Examples of the applicable imaging systems may include a digital still camera, a digital camcorder, a surveillance camera, a copier machine, a fax machine, a mobile phone, an on-vehicle camera, an observation satellite, and the like. Further, a camera module having an optical system, such as a lens, and an imaging device may be included in the imaging system. FIG. 23 illustrates a block diagram of a digital still camera as an example of the above.

The imaging system 200 illustrated as an example in FIG. 23 includes the imaging device 201, a lens 202 that captures an optical image of an object onto the imaging device 201, an aperture 204 for changing a light amount passing through the lens 202, and a barrier 206 for protecting the lens 202. The lens 202 and the aperture 204 form an optical system that converges a light onto the imaging device 201. The imaging device 201 is any of the photoelectric conversion device 100 described in the first to eleventh embodiments and converts an optical image captured by the lens 202 into image data.

The imaging system 200 further includes a signal processing unit 208 that processes an output signal output from the imaging device 201. The signal processing unit 208 performs AD conversion that converts an analog signal output from the imaging device 201 into a digital signal. Further, the signal processing unit 208 performs other operations of performing various correction or compression if necessary and outputting image data. An AD conversion unit that is a part of the signal processing unit 208 may be formed on the semiconductor substrate in which the imaging device 201 is provided, or may be formed on a different semiconductor substrate from the imaging device 201. Further, the imaging device 100 and the signal processing unit 208 may be formed on the same semiconductor substrate.

The imaging system 200 further includes a memory unit 210 for temporarily storing image data therein and an external interface unit (external I/F unit) 212 for communicating with an external computer or the like. The imaging system 200 further includes a storage medium 214 such as a semiconductor memory for performing storage or readout of imaging data and a storage medium control interface unit (storage medium control I/F unit) 216 for performing storage or readout on the storage medium 214. Note that the storage medium 214 may be embedded in the imaging system 200 or may be removable.

The imaging system 200 further includes a general control/operation unit 218 that controls various computation and controls the entire digital still camera and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes an output signal output from the imaging device 201.

The imaging device 201 outputs an imaging signal to the signal processing unit 208. The signal processing unit 208 performs predetermined signal processing on an imaging signal output from the imaging device 201 and outputs image data. The signal processing unit 208 uses an imaging signal to generate an image.

Application of the photoelectric conversion device 100 of any of the first to eleventh embodiments can realize an imaging system that can acquire a good quality image with less noise at a high sensitivity.

[Thirteenth Embodiment]

Figure 24A:
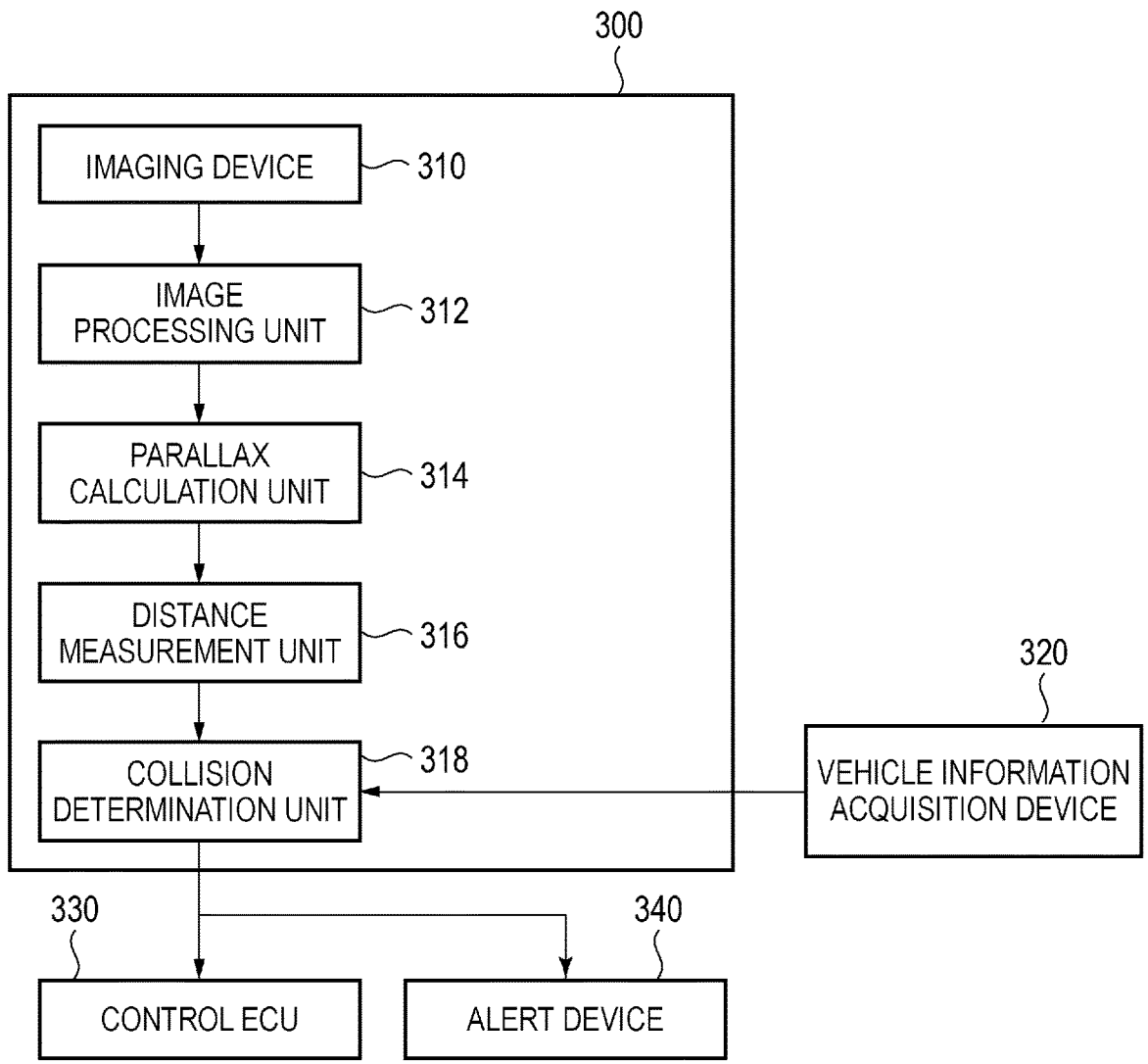
FIG. 24A is a diagram illustrating a configuration example of an imaging system according to a thirteenth embodiment.
Figure 24B:
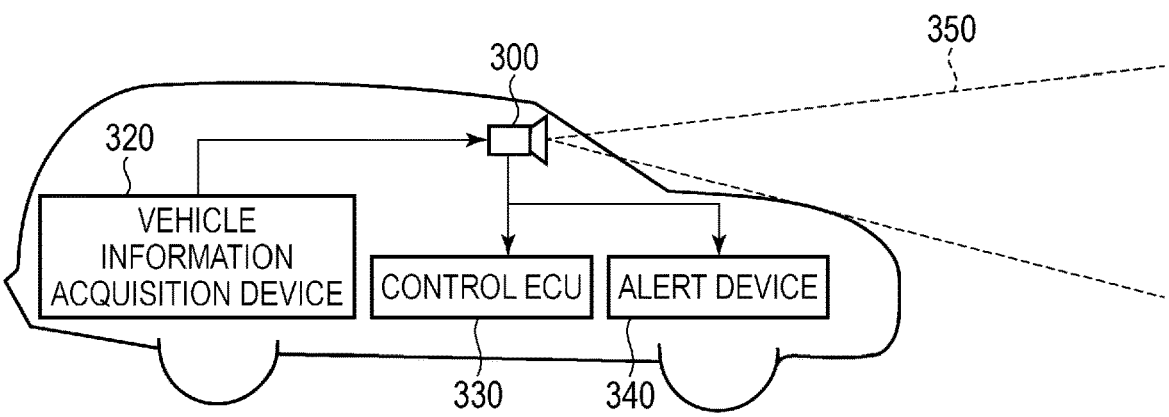
FIG. 24B is a diagram illustrating a configuration example of a movable object according to the thirteenth embodiment.

An imaging system and a movable object according to a thirteenth embodiment of the present invention will be described by using FIG. 24A and FIG. 24B. FIG. 24A is a diagram illustrating a configuration of the imaging system according to the present embodiment. FIG. 24B is a diagram illustrating a configuration of the movable object according to the present embodiment.

FIG. 24A illustrates an example of an imaging system related to an on-vehicle camera. The imaging system 300 includes an imaging device 310. The imaging device 310 is any of the photoelectric conversion devices 100 described in the above first to eleventh embodiments. The imaging system 300 includes an image processing unit 312 that performs image processing on a plurality of image data acquired by the imaging device 310 and a parallax calculation unit 314 that calculates a parallax (a phase difference of parallax images) from the plurality of image data acquired by the imaging system 300. Further, the imaging system 300 includes a distance measurement unit 316 that calculates a distance to the object based on the calculated parallax and a collision determination unit 318 that determines whether or not there is a collision possibility based on the calculated distance. Here, the parallax calculation unit 314 and the distance measurement unit 316 are an example of a distance information acquisition unit that acquires distance information on the distance to the object. That is, the distance information is information on a parallax, a defocus amount, a distance to an object, or the like. The collision determination unit 318 may use any of the distance information to determine the collision possibility. The distance information acquisition unit may be implemented by dedicatedly designed hardware or may be implemented by a software module. Further, the distance information acquisition unit may be implemented by a Field Programmable Gate Array (FPGA), an Application Specific Integrated Circuit (ASIC), or the like, or may be implemented by combination thereof.

The imaging system 300 is connected to the vehicle information acquisition device 320 and can acquire vehicle information such as a vehicle speed, a yaw rate, a steering angle, or the like. Further, the imaging system 300 is connected with a control ECU 330, which is a control device that outputs a control signal for causing a vehicle to generate braking force based on a determination result by the collision determination unit 318. Further, the imaging system 300 is connected with an alert device 340 that issues an alert to the driver based on a determination result by the collision determination unit 318. For example, when the collision probability is high as the determination result of the collision determination unit 318, the control ECU 330 performs vehicle control to avoid a collision or reduce damage by applying a brake, pushing back an accelerator, suppressing engine power, or the like. The alert device 340 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 300. FIG. 24B illustrates the imaging system in a case of capturing a front area of a vehicle (a capturing area 350). The vehicle information acquisition device 320 transmits instructions to the imaging system 300 or the imaging device 310. Such a configuration can further improve the ranging accuracy.

Although the example of control for avoiding a collision to another vehicle has been illustrated in the above description, the embodiment is applicable to automatic driving control for following another vehicle, automatic driving control for not going out of a traffic lane, or the like. Furthermore, the imaging system is not limited to a vehicle such as the subject vehicle, and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

[Modified Embodiments]

The present invention is not limited to the above-described embodiments, and various modifications are possible.

For example, an example in which a part of the configuration of any of the embodiments is added to another embodiment or an example in which a part of the configuration of any of the embodiments is replaced with a part of the configuration of another embodiment is one of the embodiments of the present invention.

Further, while photoelectric conversion devices using the photoelectric converter PD that generates electrons as signal charges have been described as examples in the embodiments described above, the same can apply to a photoelectric conversion device using a photoelectric converter PD that generates holes as signal charges. In this case, the conductivity type of semiconductor regions forming respective parts of the pixel 12 is the opposite conductivity type. Note that the names of a source and a drain of a transistor described in the above embodiments may be different in accordance with the conductivity type of the transistor, a function in interest, or the like, and all or some of the source and the drain described above may be denoted as the opposite name.

Further, the imaging system illustrated in the above embodiments are an example of imaging systems to which the photoelectric conversion device of the present invention may be applied, the imaging system to which the photoelectric conversion device of the present invention can be applied is not limited to the configuration illustrated in FIG. 23 and FIG. 24A.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-085494, filed Apr. 24, 2017 which is hereby incorporated by reference herein in its entirety.

What is claimed is:

1. A photoelectric conversion device comprising:
a plurality of pixels each of which includes a photoelectric converter that generates charges by photoelectric conversion, a first transfer unit that is connected to the photoelectric converter and transfers charges in the photoelectric converter to a first holding portion, a second transfer unit that is connected to the first holding portion and transfers charges in the first holding portion to a second holding portion, an amplifier unit that is connected to the second holding portion and outputs a signal based on charges held in the second holding portion, and a third transfer unit that is connected to the photoelectric converter and transfers charges in the photoelectric converter to a node as an overflow drain to which a power source voltage is supplied; and
a control unit that, in an exposure period in which signal charges are accumulated in the photoelectric converter, changes a potential barrier formed by the third transfer unit with respect to the signal charges accumulated in the photoelectric converter from a first level to a second level that is higher for the signal charges than the first level.

2. The photoelectric conversion device according to claim 1, wherein the first level is lower than a level of a potential barrier formed by the first transfer unit with respect to the signal charges accumulated in the photoelectric converter in the exposure period.

3. The photoelectric conversion device according to claim 1, wherein the second level is lower than or equal to a level of a potential barrier of the first transfer unit with respect to the signal charges.

4. The photoelectric conversion device according to claim 1, wherein the exposure period includes a first period in which charges held by the first holding portion of pixels arranged on a plurality of rows of the plurality of pixels are transferred to the second holding portion sequentially on a row-by-row basis.

5. The photoelectric conversion device according to claim 4, wherein the exposure period further includes a second period in which accumulation of the signal charges is continued after the first period.

6. The photoelectric conversion device according to claim 5, wherein the control unit changes the potential barrier of the third transfer unit with respect to the signal charges from the first level to the second level in the first period of the exposure period.

7. The photoelectric conversion device according to claim 6, wherein the control unit changes the potential barrier of the third transfer unit with respect to the signal charges from the first level to the second level sequentially from a pixel on a row on which an operation of transferring charges held by the first holding portion to the second holding portion has ended.

8. The photoelectric conversion device according to claim 5, wherein the control unit changes the potential barrier of the third transfer unit with respect to the charges from the first level to the second level after the first period ends.

9. The photoelectric conversion device according to claim 5, wherein the first transfer unit transfers charges of the photoelectric converter to the first holding portion between the first period and the second period.

10. The photoelectric conversion device according to claim 1, wherein the control unit changes the potential barrier of the third transfer unit with respect to the signal charges continuously from the first level to the second level.

11. The photoelectric conversion device according to claim 1, wherein the control unit changes the potential barrier of the third transfer unit with respect to the signal charges stepwise from the first level to the second level.

12. The photoelectric conversion device according to claim 1, wherein, at the end of the exposure period, the potential barrier of the third transfer unit with respect to the signal charges is the same level as the potential barrier of the first transfer unit with respect to the signal charges.

13. The photoelectric conversion device according to claim 1, wherein the control unit controls a level of the potential barrier of the third transfer unit with respect to the signal charges in accordance with a light amount of an incident light.

14. The photoelectric conversion device according to claim 13, wherein the control unit controls a potential of the third transfer unit with respect to the signal charges so that, when an amount of charges accumulated in the photoelectric converter during the exposure period under a constant light amount is equal to a saturation charge amount defined by the potential barrier of the first transfer unit, charges accumulated in the photoelectric converter does not exceed the potential barrier of the third transfer unit.

15. The photoelectric conversion device according to claim 1,
wherein the plurality of pixels include pixels used for image capture and pixels used for correction, and
wherein the control unit controls a potential barrier of the third transfer unit with respect to charges accumulated in the photoelectric converter to a third level higher than or equal to a potential barrier of the first transfer unit during the exposure period for the pixels used for correction.

16. The photoelectric conversion device according to claim 1,
wherein the plurality of pixels include pixels used for image capture and pixels used for correction, and
wherein an exposure period for a correction signal applied to the pixels used for correction is shorter than the exposure period applied to the pixels used for image capture.

17. The photoelectric conversion device according to claim 1, further comprising an amplifier circuit that amplifies a signal based on the signal charges at a gain that can be selected from a plurality of set values,
wherein the control unit sets the first level in accordance with the gain.

18. The photoelectric conversion device according to claim 1, wherein the control unit controls the potential barrier of the third transfer unit with respect to the signal charges by a voltage supplied to a gate of a transistor forming the third transfer unit.

19. The photoelectric conversion device according to claim 1, wherein the control unit controls the potential barrier of the third transfer unit with respect to the signal charges by a voltage supplied to the drain portion.

20. The photoelectric conversion device according to claim 1, wherein each of the plurality of pixels further includes a third holding unit that collects and holds at least a part of charges overflowed from the photoelectric converter.

21. The photoelectric conversion device according to claim 1, wherein
the exposure period includes a period which starts at a first time point when both the first and third transfer units become in an off state on at least one of the first and third transfer units turning off and ends at a second time point when the first transfer unit turns on for a first time after the first time point, the control unit changes the potential barrier from the first level to the second level within the period.

22. A photoelectric conversion device comprising:

a plurality of pixels each of which includes a photoelectric converter that generates charges by photoelectric conversion, a first transfer unit that is connected to the photoelectric converter and transfers charges in the photoelectric converter to a first holding portion, a second transfer unit that is connected to the first holding portion and transfers charges in the first holding portion to a second holding portion, an amplifier unit that is connected to the second holding portion and outputs a signal based on charges held in the second holding portion, and a third transfer unit that is connected to the photoelectric converter and transfers charges in the photoelectric converter to a node as an over flow drain to which a power source voltage is supplied;

an amplifier circuit that amplifies a signal based on signal charges by a gain that can be selected from at least a first gain and a second gain different from the first gain; and a control unit that controls a potential barrier formed by the third transfer unit with respect to the signal charges accumulated in the photoelectric converter to a first level when the gain is the first gain and controls a potential barrier of the third transfer unit with respect to the signal charges to a second level different from the first level when the gain is the second gain.

23. The photoelectric conversion device according to claim 22, wherein the first gain is higher than the second gain, and
wherein the first level is lower than the second level.

24. The photoelectric conversion device according to claim 22, wherein at least one of the first level and the second level is lower than a level of a potential barrier formed by the first transfer unit with respect to the signal charges accumulated in the photoelectric converter in an exposure period.

25. The photoelectric conversion device according to claim 22, wherein the control unit controls the potential barrier of the third transfer unit with respect to the signal charges by a voltage supplied to a gate of a transistor forming the third transfer unit.

26. The photoelectric conversion device according to claim 22, wherein the exposure period includes a period which starts at a first time point when both the first and third transfer units become in an off state on at least one of the first and third transfer units turning off and ends at a second time point when the first transfer unit turns on for a first time after the first time point, the control unit changes the potential barrier from the first level to the second level within the period.

27. An imaging system comprising:

the photoelectric conversion device according to claim 1; and a signal processing unit that processes signals output from the plurality of pixels of the photoelectric conversion device.

28. The imaging system according to claim 27, wherein, when an image acquired from the photoelectric conversion device includes a region in which an output is at a saturation level in a frame and an output is at an intermediate level in a next frame, the signal processing unit corrects an output of the region of the next frame to a saturation level.

29. A movable object comprising:

the photoelectric conversion device according to claim 1;
a distance information acquisition unit adapted to acquire distance information of a distance to an object based on signals from the photoelectric conversion device; and
a controlling unit adapted to control the movable object based on the distance information.

30. An imaging system comprising:

the photoelectric conversion device according to claim 22; and a signal processing unit that processes signals output from the plurality of pixels of the photoelectric conversion device.

31. The imaging system according to claim 30, wherein, when an image acquired from the photoelectric conversion device includes a region in which an output is at a saturation level in a frame and an output is at an intermediate level in a next frame, the signal processing unit corrects an output of the region of the next frame to a saturation level.

32. A movable object comprising:

the photoelectric conversion device according to claim 22;
a distance information acquisition unit adapted to acquire distance information of a distance to an object based on signals from the photoelectric conversion device; and
a controlling unit adapted to control the movable object based on the distance information.

* * * * *